United States Patent
Wang

(10) Patent No.: US 11,126,716 B2
(45) Date of Patent: Sep. 21, 2021

(54) SYSTEM SECURITY METHOD AND APPARATUS

(71) Applicant: TENCENT TECHNOLOGY (SHENZHEN) COMPANY LIMITED, Shenzhen (CN)

(72) Inventor: Lingling Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/359,096

(22) Filed: Mar. 20, 2019

(65) Prior Publication Data

US 2019/0318089 A1 Oct. 17, 2019

Related U.S. Application Data

(63) Continuation of application No. PCT/CN2017/109991, filed on Nov. 8, 2017.

(30) Foreign Application Priority Data

Nov. 11, 2016 (CN) .......................... 201611041125.4

(51) Int. Cl.
*H04L 9/00* (2006.01)
*G06F 21/56* (2013.01)
(Continued)

(52) U.S. Cl.
CPC ............ *G06F 21/564* (2013.01); *G06F 21/52* (2013.01); *G06F 21/566* (2013.01); *G06K 9/6256* (2013.01); *G06N 3/04* (2013.01)

(58) Field of Classification Search
CPC ....... G06F 21/564; G06F 21/52; G06F 21/566
(Continued)

(56) References Cited

U.S. PATENT DOCUMENTS 7,076,650 B1 * 7/2006 Sonnenberg ........ H04L 63/0227
  713/151
7,210,168 B2 * 4/2007 Hursey ................ H04L 63/145
  726/24

(Continued)

FOREIGN PATENT DOCUMENTS

CN     1794645 A     6/2006
CN   101827102 A     9/2010
(Continued)

OTHER PUBLICATIONS

The State Intellectual Property Office of the People's Republic of China (SIPO) Office Action 1 for 201611041125.4 dated Aug. 21, 2019 12 Pages (including translation).
(Continued)

*Primary Examiner* — Christopher J Brown
(74) *Attorney, Agent, or Firm* — Anova Law Group, PLLC

(57) ABSTRACT

A safeguarding method, a safeguarding apparatus, and a computer storage medium are provided. The method includes detecting a program operating on a terminal, and intercepting an operation performed by the program; identifying an object on which the program performs the operation; obtaining configuration information of the object on the terminal, and determining, based on the configuration information, that the object is a targeted monitored object. The method further includes determining, based on the configuration information of the targeted monitored object, whether the operation performed by the program on the object is a legitimate operation; and canceling intercepting the operation if the operation is a legitimate operation, and continuously intercepting the operation if the operation is an illegitimate operation.

19 Claims, 12 Drawing Sheets

(51) Int. Cl.
   *G06F 21/52* (2013.01)
   *G06K 9/62* (2006.01)
   *G06N 3/04* (2006.01)

(58) Field of Classification Search
   USPC .......................................................... 726/24
   See application file for complete search history.

(56) References Cited

U.S. PATENT DOCUMENTS

| | | | | |
|---|---|---|---|---|
| 9,171,157 | B2* | 10/2015 | Flores | G06F 21/55 |
| 9,330,274 | B2* | 5/2016 | Schepis | G06F 21/6218 |
| 9,413,782 | B1* | 8/2016 | Adams | H04L 63/1416 |
| 9,483,644 | B1* | 11/2016 | Paithane | G06F 16/128 |
| 10,122,737 | B1* | 11/2018 | McCorkendale | H04L 63/1416 |
| 10,375,143 | B2* | 8/2019 | Pevny | H04L 67/02 |
| 2009/0094676 | A1 | 4/2009 | Burugula et al. | |
| 2013/0097203 | A1* | 4/2013 | Bhattacharjee | G06F 21/604 707/783 |
| 2018/0018459 | A1* | 1/2018 | Zhang | G06F 21/554 |
| 2018/0060569 | A1* | 3/2018 | Kim | G06F 21/566 |

FOREIGN PATENT DOCUMENTS

| | | |
|---|---|---|
| CN | 102982284 A | 3/2013 |
| CN | 103034806 A | 4/2013 |
| CN | 103051613 A | 4/2013 |
| CN | 104182682 A | 12/2014 |
| CN | 104239797 A | 12/2014 |
| CN | 106682495 A | 5/2017 |

OTHER PUBLICATIONS

The World Intellectual Property Organization (WIPO) International Search Report for PCT/CN2017/109991 dated Feb. 8, 2018 5 Pages (including translation).

* cited by examiner

SYSTEM SECURITY METHOD AND APPARATUS

RELATED APPLICATIONS

This application is based upon and claims priority to PCT Application No. PCT/CN2017/109991, filed on Nov. 8, 2017, which in to claims priority to Chinese Patent Application No. 201611041125.4, filed on Nov. 11, 2016. The two applications are incorporated by reference iii their entirety.

FIELD OF TECHNOLOGY

The present disclosure relates to security technologies, and in particular, to a safeguarding method, a safeguarding apparatus, and a computer storage medium.

BACKGROUND OF THE DISCLOSURE

Currently, terminals can access a network (such as the Internet anytime and anywhere in various communication manners, such as through Wireless Fidelity (WiFi) communications and cellular communications. Inevitably, the terminals face more security threats from the Internet.

For example, in a process in which a terminal accesses a network, the terminal is implanted with a malicious program (also referred to as a computer virus) in various manners. The virus may have malicious objectives, such as stealing personal data of a user and corrupting data or a function of a terminal, which are achieved by executing the malicious program.

Malicious programs are usually invisible and can be difficult to detect. For example, a malicious software is packaged by using a shell as a common file or is in a link form to deceive a user to click. Once the user clicks it, the malicious program runs on a terminal. It is important for users to detect malicious programs on the terminal.

SUMMARY

Embodiments of the present disclosure provide a safeguarding method, a safeguarding apparatus, and a computer storage medium, capable of at least resolving problems that a safeguarding manner in a terminal is monotonous and setting of a safeguarded object lacks flexibility in the related technology.

Technical solutions of the embodiments of the present disclosure are implemented as follows:

According to a first aspect, an embodiment of the present disclosure provides a system safeguarding method. The method includes detecting a program operating on a terminal, and intercepting an operation performed by the program; identifying an object on which the program performs the operation; obtaining configuration information of the Object on the terminal, and determining, based on the configuration information, that the object is a targeted monitored object. The method further includes determining, based on the configuration information of the targeted monitored object, whether the operation performed by the program on the object is a legitimate operation; and canceling intercepting the operation if the operation is a legitimate operation, and continuously intercepting the operation if the operation is an illegitimate operation.

According to another aspect, an embodiment of the present disclosure provides a safeguarding apparatus, including a processor and a memory, the processor being capable of running a computer executable instruction in each function unit on the memory, and the functional unit on the memory including: a monitoring unit, configured to detect a program running on a terminal, and determine an object on which an operation is performed by the program; an interception unit, configured to intercept the operation performed by the program; a targeted monitoring determining unit, configured to obtain configuration information of a targeted monitored object in the terminal, and determine, based on the configuration information, that the object is the targeted monitored object; and a processing unit, configured to determining, based on the configuration information of the targeted monitored object whether the operation performed by the program on the object is a legitimate operation, the interception unit canceling intercepting the operation if the operation is a legitimate operation, and continuously intercepting the operation if the operation is an illegitimate operation.

Another aspect of the present disclosure provides a safeguarding method. The method includes detecting, by a terminal, a program running on the terminal, and intercepting an operation performed by the program determining, by the terminal, an object on which the program performs the operation; and obtaining, by the terminal, configuration information of a targeted monitored object in the terminal, and determining, based on the configuration information, that the object is the targeted monitored object. The method further includes determining, by the terminal based on the configuration information of the targeted monitored object, whether the operation performed by the program on the object is a legitimate operation; and canceling intercepting the operation if the operation is a legitimate operation, and continuously intercepting the operation if the operation is an illegitimate operation.

In the technical solutions of the embodiments of the present disclosure, a solution of setting a targeted monitored object is provided. Targeted safeguarding can be performed based on configuration information of the targeted monitored object for an operation performed by a program on the targeted monitored object, so as to better defend the targeted monitored object, so that so that safeguarding of a non-targeted monitored object and safeguarding of a targeted monitored object can be easily distinguished according to configuration information. Meanwhile, safeguarding of a targeted monitored object can be flexibly set according to corresponding configuration information, thereby providing targeted safeguarding on an object.

DESCRIPTION OF EMBODIMENTS

Figure 1A:
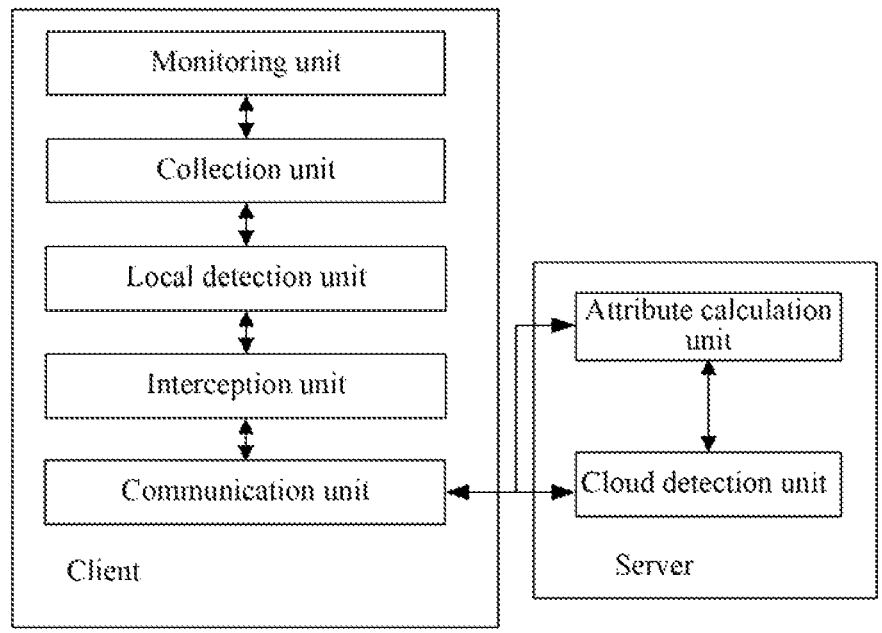
FIG. 1A is a schematic diagram of a functional structure of a safeguarding apparatus according to an embodiment of the present disclosure.

The following further describes the present disclosure in detail with reference to the accompanying drawings and embodiments. It should be understood that the embodiments provided herein are merely used to explain the present disclosure, but are not intended to limit the present disclosure. In addition, the embodiments provided below are some embodiments for implementing the present disclosure rather than all embodiments for implementing the present disclosure. Embodiments obtained by a person skilled in the art by recombining technical solutions of the following embodiments without creative efforts and other embodiments implemented based on the disclosure all fall within the protection scope of the present disclosure.

It should be noted that in the embodiments of the present disclosure, the terms "include", "comprise", and any variants thereof are intended to cover a non-exclusive inclusion. Therefore, a method or an apparatus tat includes a series of elements not only includes such elements that are disclosed expressly, but also includes other elements that are not specified expressly, or may include inherent elements of the method or the apparatus. Unless otherwise specified, an element limited by "include a/an . . . " does not exclude other relevant elements (for example, steps in a method or units in an apparatus) existing in the method or the apparatus that includes the element.

For example, a safeguarding method provided by the embodiments of the present disclosure includes a series of steps, but the safeguarding method provided by the embodiments of the present disclosure is not limited to the disclosed steps. Similarly, a safeguarding apparatus provided by the embodiments of the present disclosure includes a series of units, but the safeguarding apparatus provided by the embodiments of the present disclosure is not limited to including the units that are disclosed expressly, and can further include units that need to be set when relevant information is obtained or when processing is performed based on information.

Before the present disclosure is further described in detail, nouns and terms involved in the embodiments of the present disclosure are described, and the nouns and terms involved in the embodiments of the present disclosure are applicable to the following explanations.

1) A terminal is a computing device in various forms, such as a smartphone, a tablet computer, and an in-vehicle terminal, used on a user side.

2) A malicious program, also referred to as a computer virus, is a code implanted by a compiler into a terminal (various computing devices such as a smartphone, a tablet computer, a notebook computer, and a desktop computer) for corrupting a function or data of the terminal and affecting normal use of the terminal.

3) A multilayer feed forward (e.g., Back Propagation, BP) neural network is a neural network trained according to an error back propagation algorithm.

4) KiFastCallEntry is an operating system kernel interface (Application Programming Interface, API) and is an entry that needs to pass by from an application layer to a kernel.

5) The hardware virtualization technology is running an operating system without modification by virtualizing an instruction set, a memory map unit (MMU), and input/output (I/O).

6) An object is a general name of data in various forms in a terminal, includes a text file, a media file, a program, a program installation package, a library file, and the like in terms of type, and includes a system file such as an operating system program and a library file), a program (used for implementing various functions such as editing, media, and network advertisement), and a user file (such as a media file saved by a user) in terms of source.

7) A machine learning model in the present disclosure has such performance of automatically analyzing samples of programs to obtain a capability of predicting weights of attributes in respective dimensions of an unknown program.

Security software installed in a terminal is provided to monitor data and of on a user terminal, analyze programs running on the terminal, identify a malicious program causing a threat to security of the terminal, and automatically clean up the malicious program, for example, by isolating the malicious program, deleting the malicious program, or prompting a user to select how to handle the malicious program.

Data and objects on a terminal can include a text file, a media file, a program, a program installation package, and a library file, and the data sources can include system data and user data. Different objects are of different importance to a user. Often network security applications is monotonous and not specifically targeting security problems.

Figure 1B:
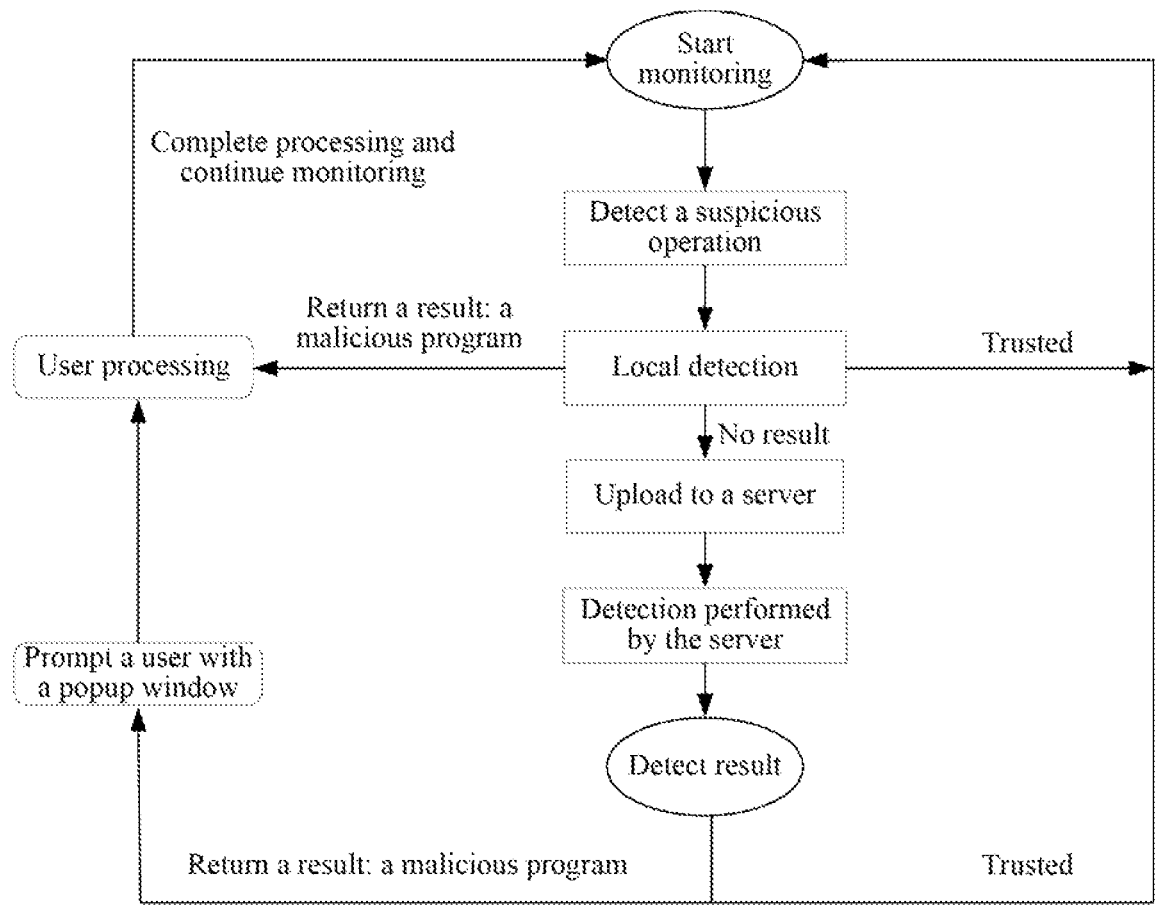
FIG. 1B is a flowchart of a safeguarding method according to an embodiment of the present disclosure.

AA schematic diagram of a functional structure of a safeguarding apparatus according to an embodiment of the present disclosure is shown in FIG. 1A, and a flowchart of a safeguarding method according to an embodiment of the present disclosure is shown in FIG. 1B.

A safeguard client in a terminal includes a monitoring unit, an interception unit, a collection unit, a local detection unit, and a communication unit. With reference to FIG. 1B, the monitoring unit detects a suspicious operation of a program in the terminal, collects (by using the collection unit) attribute data related to the program, performs detection based on a local malicious program signature database, and prompts a user to perform an operation or processing in a manner such as a popup window if it is detected that the program is a malicious program.

Monitoring is continued if the program is trusted. A program whose local detection has no accurate result can be determined to be a trusted program. Alternatively, related attribute data (by using the collection unit) is submitted to (by using the communication unit) to a cloud server. The cloud server calculates an attribute in each dimension (performing calculation by using an attribute calculation unit), performs detection (implemented by using the local detection unit) based on a malicious program signature database (usually, bigger than the malicious program signature database of the terminal, so that the detection is more comprehensive), determines that the program is a malicious program and prompts the user to perform processing if the attribute matches a signature in the malicious program signature database, and determines that the program is a trusted program and notifies that the monitoring can be continued if the attribute does not match a signature in the malicious program signature database.

Based on the safeguarding solutions provided by FIG. 1A and FIG. 1B, the safeguarding manner is monotonous. Monitoring behaviors of objects on which programs perform operations in a unified manner cannot provide targeted safeguarding for different objects in the terminal.

Figure 2:
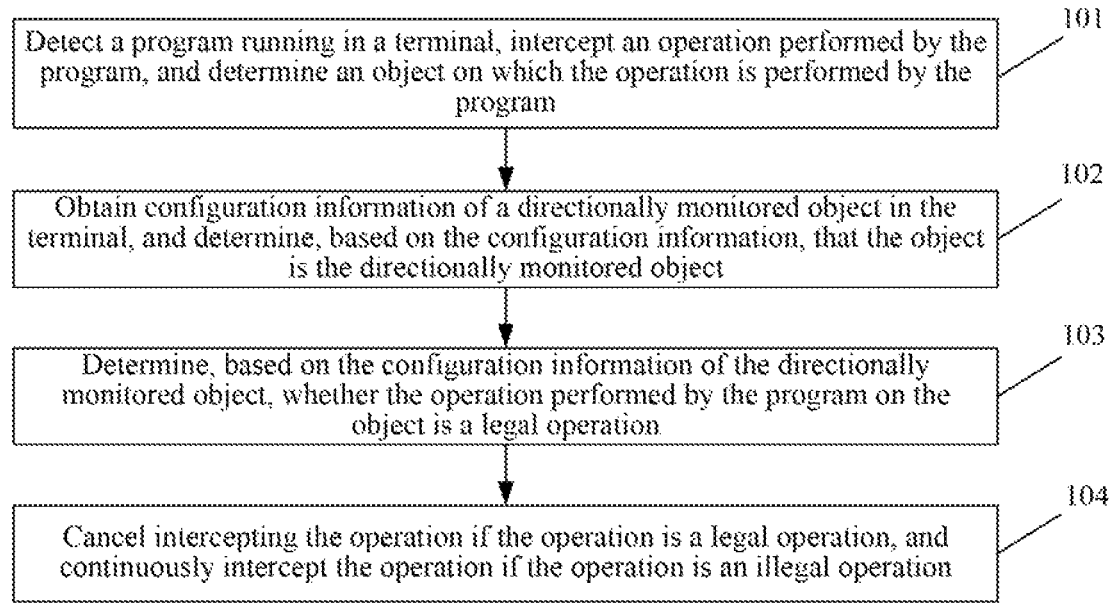
FIG. 2 is a schematic flowchart of a safeguarding method according to an embodiment of the present disclosure.

With regard to the foregoing problem, this embodiment of the present disclosure provides a safeguarding method. FIG. 2 is a schematic flowchart of a safeguarding method according to an embodiment of the present disclosure. As shown in FIG. 2, the safeguarding method of this embodiment includes the following steps:

Step 101: Detect a program running on a terminal, intercept an operation performed by the program, and determine an object on which the program performs the operation.

Step 102: Obtain configuration information of a targeted monitored object in the terminal, and determine, based on the configuration information, that the object is the targeted monitored object.

Step 103: Determine, based on the configuration information of the targeted monitored object, whether the operation performed by the program on the object is a legitimate operation.

Step 104: Cancel intercepting the operation if the operation is a legitimate operation, and continuously intercept the operation if the operation is an illegitimate operation.

In view of the above, by means of providing a solution of setting a targeted monitored object in an object of the terminal, targeted safeguarding can be performed based on configuration information of the targeted monitored object for an operation performed by a program on the targeted monitored object, so that safeguarding of a non-targeted monitored object and safeguarding of the targeted monitored object can be easily distinguished according to configuration information.

On the one hand, performing safeguarding according to the configuration information of the targeted monitored object enables flexible settings by using corresponding configuration information, thereby providing targeted safeguarding for an object.

On the other hand, for a non-targeted monitored object, at least one of a manner of matching a malicious program signature database of the terminal with an attribute of the program and a manner of invoking a malicious program detection service in a cloud is provided to detect whether a program is a malicious program, so as to providing safeguarding of the non-targeted monitored object with targeted safeguarding of the targeted monitored object. This not only satisfies a requirement of a user for personalized safeguarding for some objects, but also can ensure security of other objects in the terminal.

This embodiment of the present disclosure further provides a safeguarding apparatus for performing the foregoing safeguarding method with regard to the following two cases: 1) in the foregoing method, when the terminal does not invoke the malicious program detection service in the cloud, the safeguarding apparatus cart be implemented based on a hardware resource of the terminal on the user side; and 2) in the foregoing method, when the terminal invokes the malicious program detection service in the cloud, the safeguarding apparatus can be implemented based on a hardware resource of the terminal on the user side and a hardware resource of a server on the network side.

It could be understood that hardware can be deployed in the terminal on the user side or separately deployed in the terminal on the user side and the server n the network side.

Figure 3:
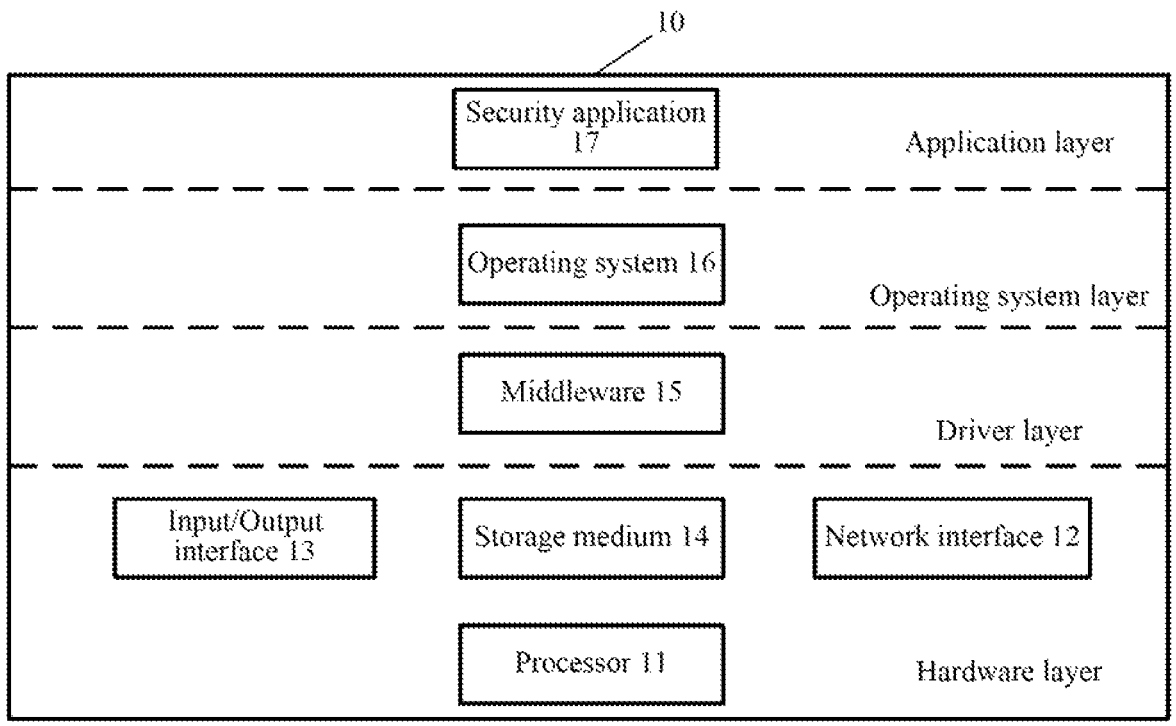
FIG. 3 is a schematic diagram of a software and hardware structure of a safeguarding apparatus according to an embodiment of the present disclosure.

Referring to FIG. 3, FIG. 3 is a schematic diagram of a software and hardware structure of a safeguarding apparatus 10. The safeguarding apparatus 10 includes a hardware layer, an intermediate layer, an operating system layer, and a software layer. However, it should be understood by a person skilled in the art that the structure of the safeguarding apparatus 10 shown in FIG. 3 is merely an example rather than a limitation to the structure of the safeguarding apparatus 10. For example, more components, compared with FIG. 3, may be disposed in the safeguarding apparatus 10 according to practical requirements, or some components may be omitted according to practical requirements.

The hardware layer of safeguarding apparatus 10 includes a processor 11, at input/output interface 13, a storage medium 14, and a network interface 12, and components can be connected by a system bus for communication.

The processor 11 may be implemented as a central processing unit (CPU), a microcontroller unit (MCU), an application-specific integrated circuit (ASIC), or a field-programmable gate array (FPGA).

The input/output interface 13 may be implemented by using an input/output device such as a display screen, a touchscreen, or a speaker.

The storage medium 14 may be implemented by using a non-volatile storage medium such as a flash memory, a hard disk, or an optical disc, or may be implemented by using a volatile storage medium such as a double data rate (DDR) dynamic cache, and stores an executable instruction used for performing the foregoing safeguarding method.

For example, the storage medium 14 may be disposed together with other components of the safeguarding apparatus 10 at a same location (for example the terminal on the user side), and may be separately disposed with respect to other components in the safeguarding apparatus 10. The network interface 12 provides a capability of accessing external data, for example, on a remotely disposed storage medium 14, for the processor 11. For example, the network interface 12 can perform short distance communication based on the near field communication (NFC) technology, the Bluetooth technology, or the ZigBee technology, and in addition, can further implement cellular communication based on communication standards such as Code Division Multiple Access (CDMA) and Wideband Code Division Multiple Access (WCDMA) and their evolved standards, and for another example, communication of accessing the network side through a wireless access point (AP) in a wireless fidelity (WiFi) manner.

A driver layer includes middleware 15 provided for the operating system 16 to identify the hardware layer and communicate with respective components on the hardware layer, and for example, may be a set of drivers for the respective components of the hardware layer.

The operating system 16 is used for providing a user-oriented graphical interface, and for example, includes a plug-in icon, a desktop background, and an application icon. The operating system 16 supports control of the user on a device by means of the graphical interface. In this embodiment of the present disclosure, a software environment, for example, a type and a version of an operating system, of the foregoing device is not limited, and may be a Linux operating system, a UNIX operating system, or another operating system.

The application layer includes a security application 17 running on the terminal on the user side or a module (or a functional plug-in) capable of coupling to sec ray software in the terminal, where an executable instruction is set in the module and used for performing the foregoing safeguarding method.

Figure 4A:
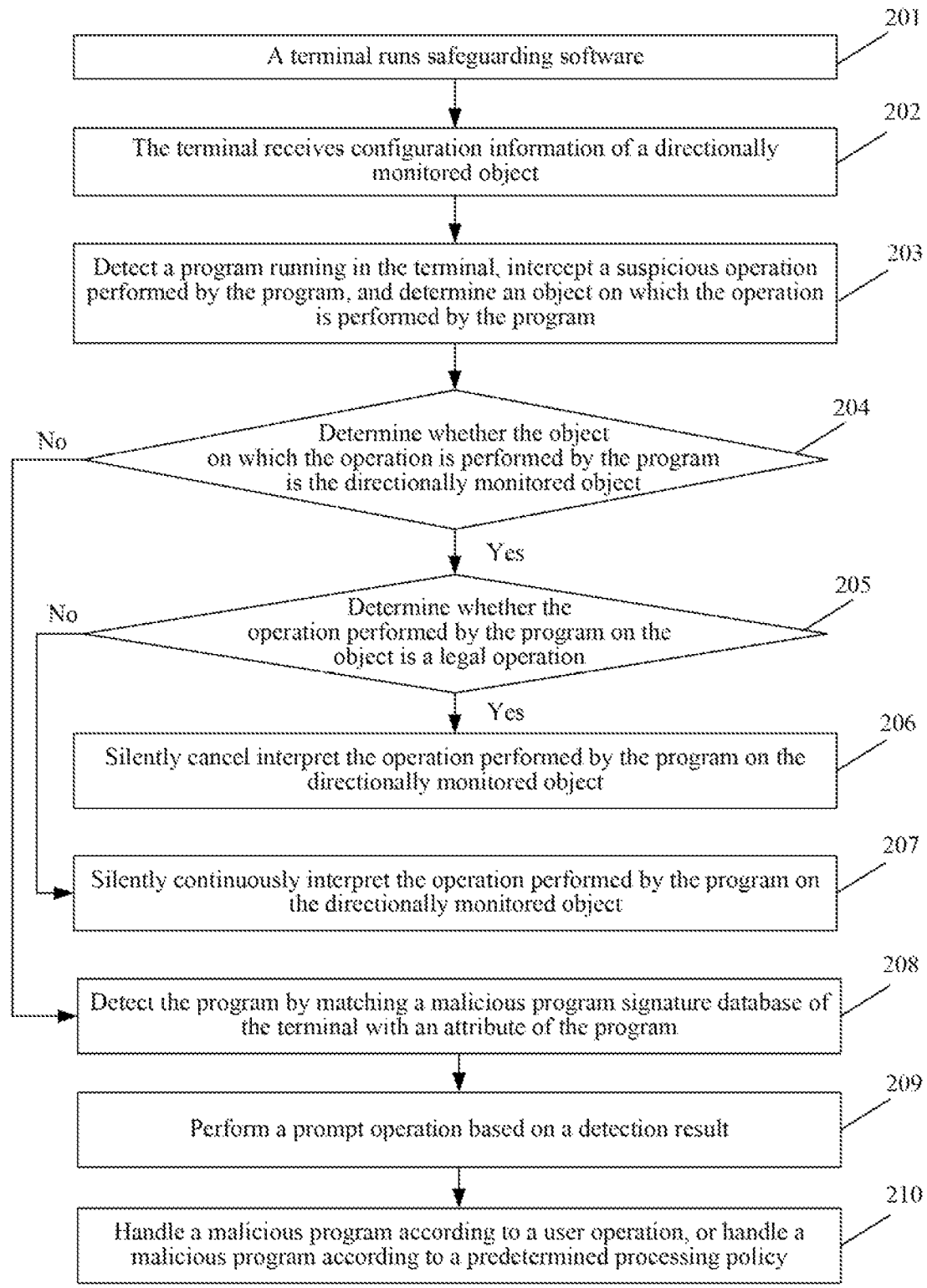
FIG. 4A is a schematic flowchart of a safeguarding Method according to an embodiment of the present disclosure.

First, performing the safeguarding application method in a terminal on the user side is used as an example for description. FIG. 4A is a schematic flowchart of a safeguarding method applied to a terminal on the user side according to an embodiment of the present disclosure, including the following steps:

Step 201: A terminal runs safeguarding software.

The safeguarding software is used for implementing a safeguarding function provided by this embodiment of the present disclosure, and alternatively, this embodiment of the present disclosure may provide a functional module (also regarded as a functional plug-in) used for coupling to the safeguarding software, where the functional module is used for implementing the safeguarding method on the basis of an existing function (for example, an existing malicious program signature database) of the safeguarding software.

It could be understood that the operations of the safeguarding software may include power-up, periodical operations, operations according to a user instruction, and the like. In an implementation, after a terminal is powered up, safeguarding software is run, and afterward, the safeguarding software can be run periodically, that is, the safeguarding software is run at regular intervals. In this way, memory can be saved, and power consumption of the terminal can be reduced. In some embodiments, the safeguarding software can alternatively be flexibly run according to a user instruction. For example, when a user visits a specific unfamiliar website, the user can run the safeguarding software by means of an operation.

Step 202: The terminal receives configuration information of a targeted monitored object.

The so-called targeted monitoring means that for a specified targeted monitored object, based on a legitimate operation and/or an illegitimate operation configured in configuration information, an operation performed by any program on the targeted monitored object in a terminal is processed silently, for example, an operation is allowed or intercepted, thereby avoiding interference on a user.

In an embodiment, the terminal specifies a targeted monitored object according to a operation of a user, and stores an identifier of the targeted monitored object specified by the user in configuration information, and the targeted monitored object includes different specified dimensions for the user to choose.

For example, a dimension of setting a monitored object includes an object source. For example, the terminal provides a targeted monitored object setting interface shown in FIG. 4B, where check boxes are provided to support a user to set a source of an object that needs to be targeted monitored in objects of a plurality of sources. In some embodiments, a drop-down box may alternatively be provided for selecting one or more objects that need to be targeted monitored from objects of each source.

Corresponding objects may be classified into the following categories in a dimension of a source:

1) A program: for example, a social application installed by a user, an online game application, and a third-party payment application. A record of using the program by a user is further included, and includes a username and a password for logging in to a third party payment backend, a historical chat record of a social application, the like.

2) System data: for example, various programs, library files, and the like of an operating system in a terminal.

3) User data: various user files, such as a text, file, a media file (for example, a picture and a video), and an email, stored by a user in a terminal.

For example, a dimension of setting a monitored object includes an object type. For example, the terminal provides a targeted monitored object setting interface shown in FIG. 4C, where check boxes are provided to support a user to set a type of an object that needs to be targeted monitored in a dimension of a type. In some embodiments, a drop-down box may alternatively be provided for selecting one or more objects that need to be targeted monitored from objects of each type.

Objects may be classified into the following categories in a dimension of a type:

1) A text file; 2) a media file; 3) a program, including a built-in program of an operating system of a terminal and a program installed by a user in the terminal; 4) a program installation package; and 5) a library file needed for running a program.

In another embodiment, in addition to the identifier of the targeted monitored object, the configuration information of the targeted monitored object, optionally, further includes an operation that is performed by a program on the targeted monitored object and that the user wants to block, that is, an illegitimate operation, and alternatively, the configuration information further includes an operation that is performed by a program on the targeted monitored object and that the user does not want to block, that is, a legitimate operation.

For example, in an example in which an object is a media file of a user in a terminal, the user does not want that a program can perform a read/write operation to ensure personal privacy security, and corresponding configuration information may be in the following form: media file-illegitimate operation-read/write.

For another example, in an example in which an objet is a game program of a user installed in a terminal, the user does not want that an injection operation is performed on the game program, and corresponding configuration information may be in the following form: game program-illegitimate operation-injection.

For still another example, in an example in which an object is an address book of a user in a terminal, the user only wants that the address book can be read, but cannot be maliciously modified, and corresponding configuration information may be in the following form: address book-injection-read.

It should be noted that for a user, the targeted monitored object (identifier) in the configuration information is necessary information, and a corresponding legitimate operation and/or illegitimate operation are/is selectable configuration. Particularly, when the user only sets the identifier of the targeted monitored object in the configuration information, a terminal uses a default legitimate operation and/or illegitimate operation corresponding to the targeted monitored object.

Figure 4B:
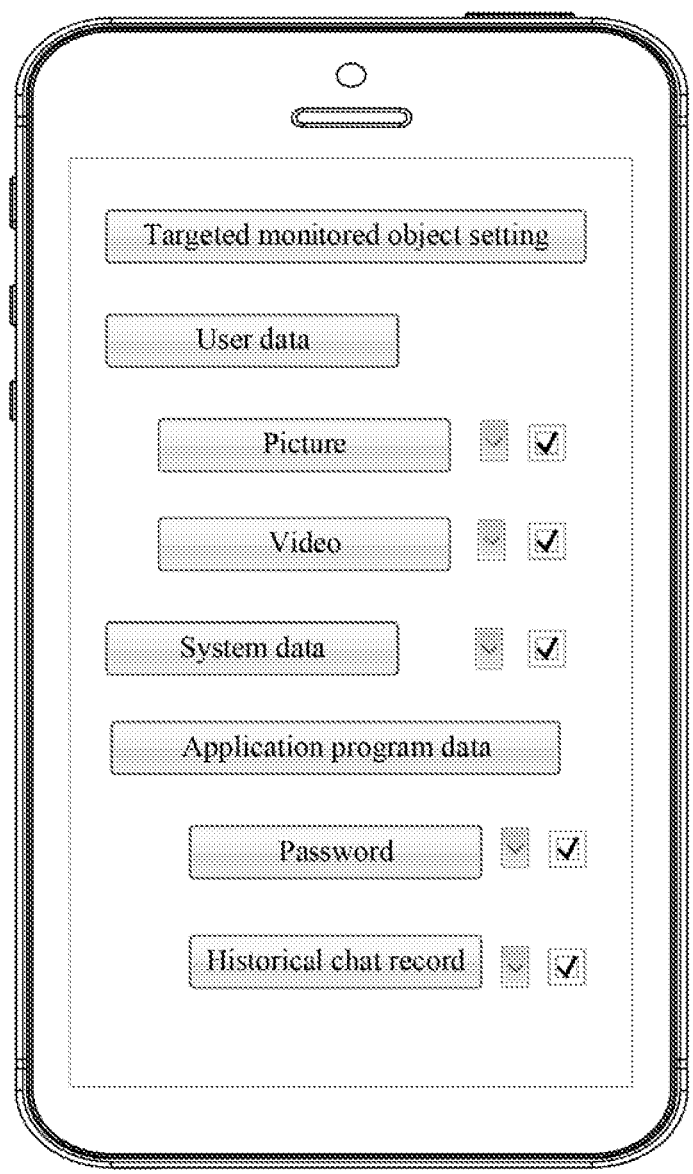
FIG. 4B.
Figure 4C:
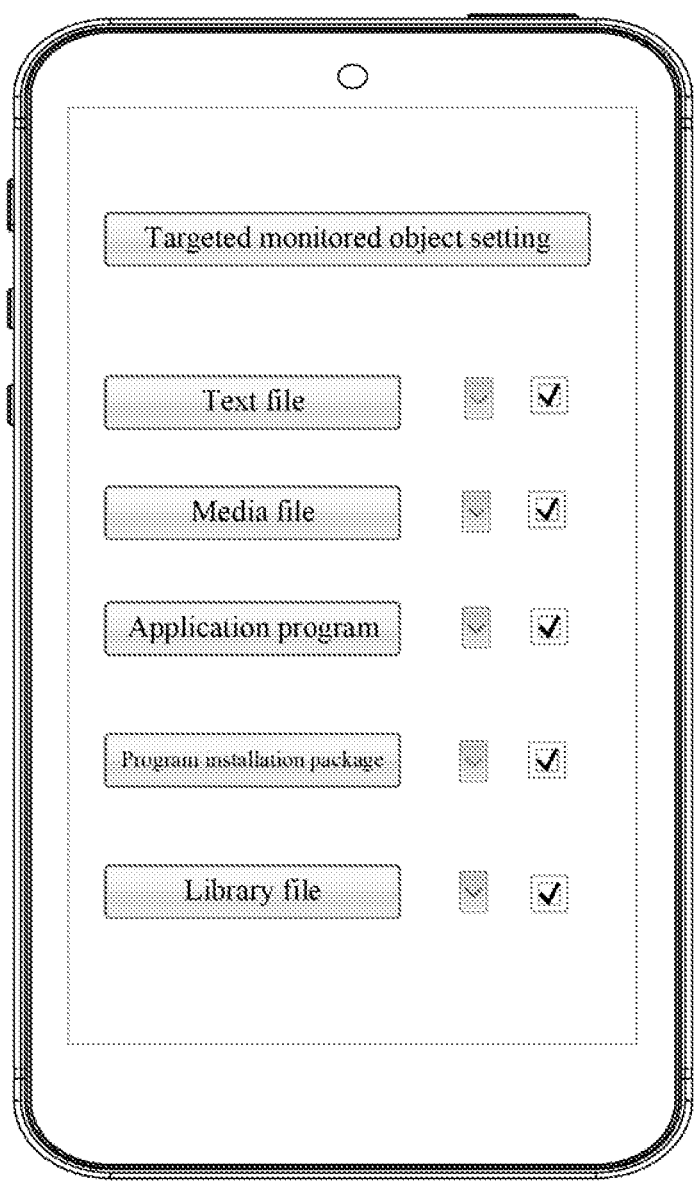
FIG. 4C, and FIG. 4D are targeted monitored object setting interfaces in an embodiment of the present disclosure.

For example, a user chooses a category "Picture" in the targeted monitored object setting interface shown in FIG. 4B, but no corresponding legitimate operation and/or illegitimate operation is set, so that the terminal uses a default illegitimate operation "read/write" for the category "Picture", and corresponding configuration information may be represented as: picture-illegitimate operation-read/write.

Figure 4D:
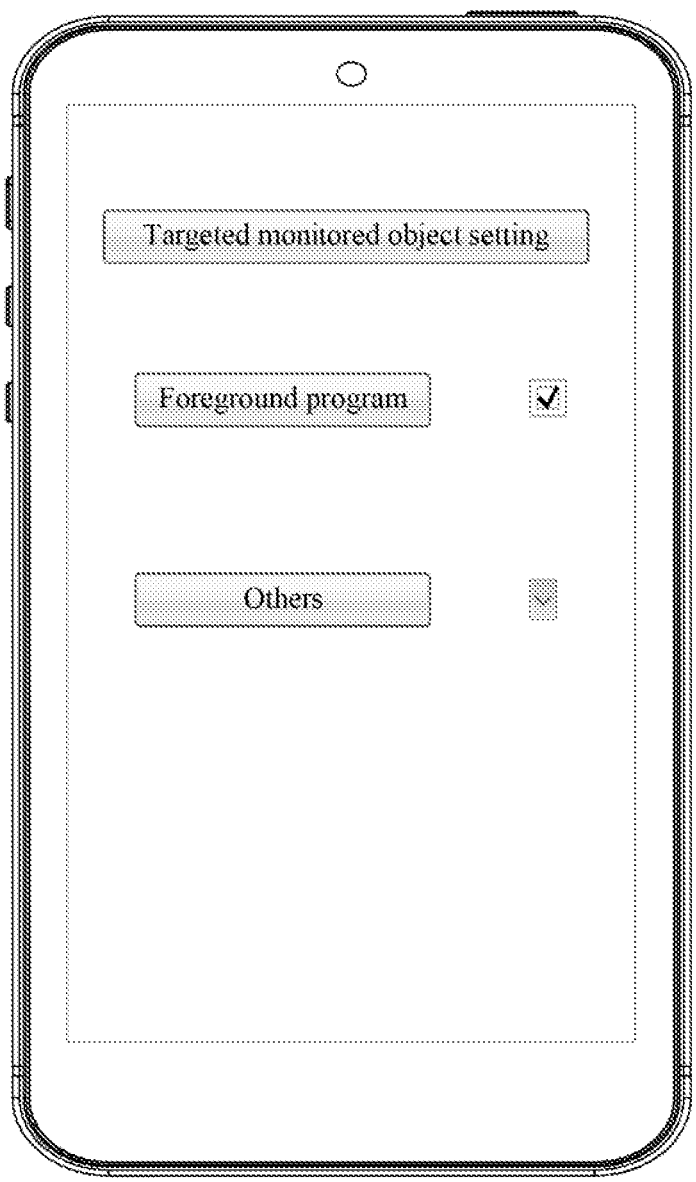

In an implementation, the targeted monitored object may be a program miming in the foreground, and the terminal provides the targeted monitored object setting interface shown in FIG. 4D. If a user selects the "Foreground program" option, equivalent to using a program that keeps a foreground operating state as the targeted monitored object, the terminal dynamically maintains configuration information in the following manner: periodically detecting a program (for example, a game) in a foreground operating state, and writing an identifier of the program running in the foreground into configuration information, for example, e following form: identifier of a program running in the foreground-legitimate operation (and/or illegitimate operation).

It could be understood that in the configuration information, a legitimate operation (and/or an illegitimate operation) of a program running in the foreground may be set according to an operation of a user, or when a user does not set an operation, a legitimate operation (and/or illegitimate operation) set by default is used. For example, a default setting may be "illegitimate operation-injection".

In addition, in the targeted monitored object setting interface shown in FIG. 4D, the terminal supports a user to set all programs running in the foreground in the terminal as targeted monitored objects by selecting the "Foreground program" option, and also supports further setting a foreground program by using a drop-down box. For example, a program running in the foreground is set in one or a combination of the following manners:

1) One or more programs are set. Using setting a specific game program as an example, only when the program is in a foreground operating state, the terminal identifies it as a targeted monitored object and generates corresponding configuration information.

2) One or more programs, such as programs of a game type and programs of a media type (a media play program and the like), are set. Only when a program of a type set by a user is in a foreground operating state, the terminal identifies it as a targeted monitored object and generates corresponding configuration information.

Step 203: Detect a program running in the terminal, intercept a suspicious operation performed by the program, and determine an object on which the program performs the operation.

In an embodiment, an operating program, a performed operation (opening a file, reading a registry, and the like), and an object on which an operation is performed (information such as a to-be-opened file and a registry path) are detected in a manner of monitoring system invocation in a terminal, and it is detected that an operation performed by a program is a suspicious operation.

The suspicious operation is an operation that threats security of an object or an operation sequence including a series of operations. The suspicious operations are distinguished according to an illegitimate operation.

For example, for an illegitimate operation of elevating control permission by registering a service program, a program usually provides control permission in a manner of performing an operation on a registry in a path to register a service. Therefore, for the illegitimate operation of elevating control permission, an operation sequence including the operation performed by the program on the registry and the operation of registering the service is a suspicious operation.

When a terminal runs an X86 system, system invocation of a process of any other program in the terminal is monitored by running a Hook-based KiFastCallEntry program in the terminal.

Figure 4E:
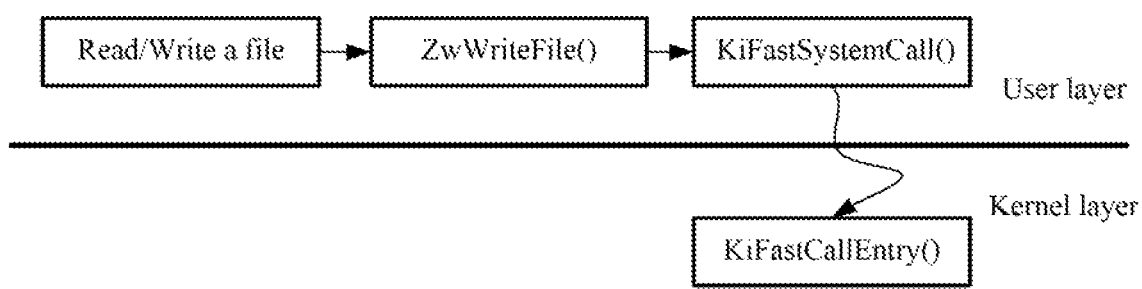
FIG. 4E is a schematic implementation diagram of monitoring program invocation of a user space in a kernel space in an embodiment of the present disclosure.

How to switch to a NtWriteFile system service is described by using invocation of API WriteFile of the X86 system as an example. When a process of a program write data into a file by using WriteFile( ) API. WriteFile( ) API switches to a kernel to execute a Service Routine of a system. As shown in FIG. 4E, with regard to a call of the WriteFile( ) function, a call of the ZwWriteFile( ) function of a subsystem dynamic library file is generated, the ZwWriteFile( ) function obtains a function address value of KiFastSystemCall( ) from a shared data structure region of a user, the function is the last function running in the user layer, and the ZwWriteFile( ) function in the kernel layer is switched, so as to switch program invocation of the user layer to the KiFastCallEntry( ) function and perform monitoring.

For a terminal running an X64 system, because a process is protected and the Hook mechanism cannot be used, and a hardware virtualization monitoring system is used for monitoring a process of a program in a manner of reading an MSR register.

Step 204: Determine whether the object on which the program performs the operation is the targeted monitored object, and if yes, perform step 205; otherwise, perform step 208.

In an embodiment, as stated above, configuration information of each targeted monitored object is maintained in the terminal, and an identifier of an object and an operation (for example, an operation and/or an illegitimate operation) on the object are recoiled in the configuration information, so that once an identifier of an object on which a programs performs operation matches the identifier of the object configured in the configuration information of the targeted monitored object, it is determined that the object on which an operation is currently performed is the targeted monitored object.

For example, assuming that a program in a terminal attempts to perform an injection operation on a game program, the terminal traverses configuration information and finds by searching that a user configures configuration information of the game program, it is determined that the game program is a targeted monitored object.

In another embodiment, as stated above, with regard to a case in which a user selects the "Foreground program" option in FIG. 4E to automatically set a program running in the foreground to be a targeted monitored object, the terminal is configured to identify a program in a foreground operating state as a targeted monitored object, and the terminal maintains configuration information in real time for the program running in the foreground, where in the configuration information, an operation (including a legitimate operation and/or an illegitimate operation) on the targeted monitored object is set according to a user operation or is set by default. When it is detected that a program in a terminal performs an operation on an object, if the object is a program configured in the configuration information and the program is in a foreground operating state, it is determined that the object is a targeted monitored object.

For example, assuming that a program in a terminal attempts to perform an injection operation on a game program, and a user selects the "Foreground program" option in FIG. 4E to automatically set a program running in the foreground to be a targeted monitored object, the terminal traverses configuration information and finds by searching that the game program is configured in configuration information automatically generated by detecting a foreground program by the terminal, indicating that the game is currently in a foreground operating state, it is determined that the game program is a targeted monitored object.

Step 205: Determine, based on the configuration information of the targeted monitored object, whether the operation performed by the program on the object is a legitimate operation, and if yes, perform step 206; otherwise, perform step 207.

The terminal searches for configuration information of the targeted monitored object, and performs corresponding processing according to a legitimate operation or illegitimate operation configuration situation in the configuration information.

1) For example, whether a pre-configured illegitimate operation in the configuration information of the targeted monitored object includes the operation performed by the program on the object is determined, and if yes, the operation performed by the program on the object is an illegitimate operation; otherwise, the operation is a legitimate operation.

Step 206: Silently cancel interpret the operation performed by the program on the targeted monitored object.

Silently allowing the operation performed by the program on the targeted monitored object is allowing the program to initiate invocation of a corresponding application programming interface (for example, an application programming interface of a read/write operation) for performing the operation on the targeted monitored object and to not initiate a prompt operation on the user layer, so that the user would not perceive a safeguarding operation performed on the operation on the monitored object.

For example, still using the foregoing terminal running an X86 system as an example, the KiFastCallEntry( ) function of the kernel layer allows a call of the WriteFile( ) function, so that a write operation on a file is performed by using API WriteFile of the X86 system.

Step 207: Continuously interpret the operation performed by the program on the targeted monitored object.

Intercepting the operation performed by the program on the targeted monitored object is to not allow the program to initiate invocation of a corresponding application programming interface (for example, an application programming interface of a read/write operation) for performing the operation on the targeted monitored object and to not initiate a prompt operation on the user layer, so that the user would perceive a safeguarding operation performed on the operation on the monitored object.

For example, still using the foregoing terminal running an X86 system as an example, the KiFastCallEntry( ) function of the kernel layer would not allow a call of the WriteFile( ) function, so that a write operation on a file would not be performed by using API WriteFile of the X86 system.

Step 208: Detect the program by matching a malicious program signature database of the terminal with an attribute of the program.

In an embodiment, a malicious program signature database is maintained in the terminal, and the malicious program signature database stores attributes in a plurality of dimension of malicious programs. For example, the attributes include the following dimensions:

1) A digital signature of a program, which has uniqueness and is used for authenticating security of the program.

2) Program information: for example, information, such as a name, a version, and a volume, of a program.

3) Message Digest Algorithm 5 (MD5) of a program, used for authenticating integrity of a program.

4) Information of a Portable Execute (PE) file: for example, an import table of the PE file. In an example in which the terminal rims a Windows system, information of executable files of types, such as DLL, EXE, OCX, and SYS, is included.

5) Another attribute: for example, a specific character string, a specific function, and the like included by a program, whether a program is packed, a programming interface (API) for running a program, and whether a program has a hijacking function.

Figure 4F:
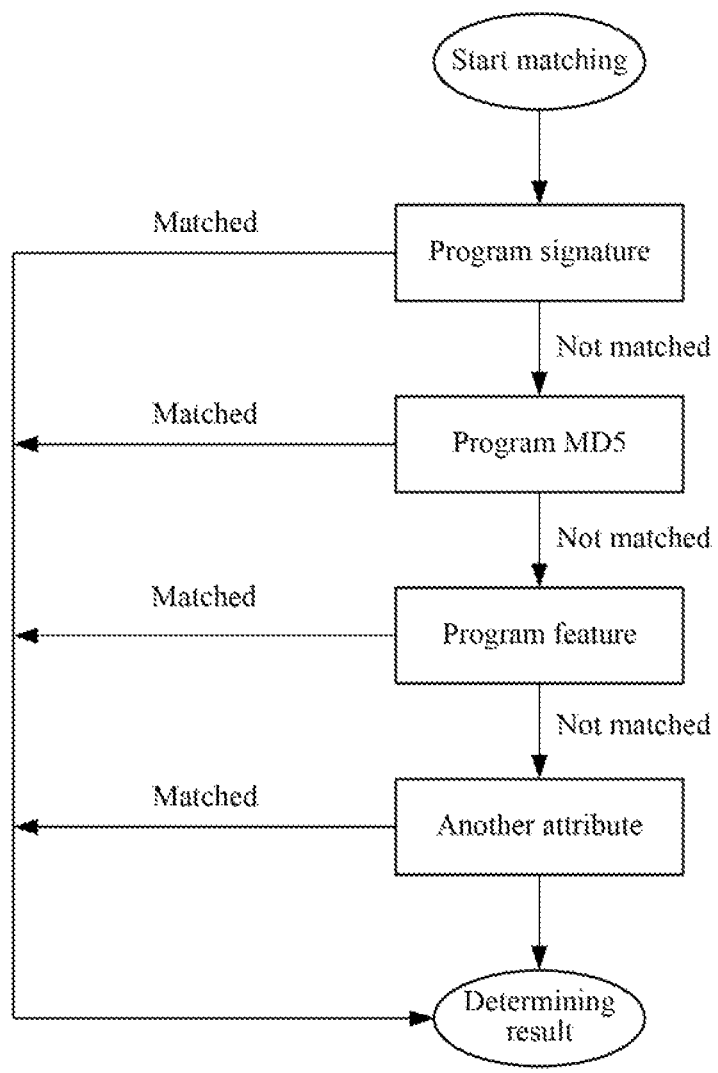
FIG. 4F is a schematic flowchart of detecting a program based on a manner of matching a malicious program signature database of a terminal with an attribute of the program according to an embodiment of the present disclosure.

When a program is detected based on a local malicious program signature database of the terminal, referring to the schematic flowchart of detecting a program based on a manner of matching a malicious program signature database of a terminal with an attribute of the program shown in FIG. 4F, attributes in a plurality of dimensions oldie program, such as a digital signature of the program, the MD5 of the program, a feature of the program, and another attribute, are sequentially matched with attributes in corresponding dimensions in the malicious program signature database, and it, is determined that the detected program is a malicious program when attributes in at least one dimension are successfully matched.

On the one hand, detecting a malicious program in a manner of matching with a malicious program signature database can reduce occupation of storage space of the terminal to a largest extent, and on the other hand, because an attribute in the malicious program signature database is a feature with significant identifiability of the malicious program, a program is determined to be a malicious program once attributes in one dimension are successfully matched. The detection is in real time and reduces occupation of calculation resources of the terminal.

In addition, to further improve efficiency of detecting a malicious program based an the malicious program signature database, attributes in a plurality of dimensions of the malicious program signature database of the terminal can be correspondingly matched with attributes in correspondingly dimensions of the program, and the program can be determined to be a malicious program once attributes in one dimension are successfully matched.

Step 209: Perform a prompt operation based on a detection result.

Step 210: Handle a malicious program according to a user opera ion, or handle a malicious program according to a predetermined processing policy.

In an embodiment, when a malicious program is detected, the malicious program, including a name of the malicious program, a location of the malicious program, an operation that the malicious program attempts to perform, and the like, is prompted in a form such as a popup window or audio, and an operation, such as deletion, isolation, or permission, that can be performed on the malicious program is prompted. If the user does not choose how to perform processing within a waiting time, a unified processing manner of intercepting all or some of operations performed by the malicious program is performed, and alternatively, a processing manner of isolating or deleting the malicious program can be adopted.

Silently processing an operation performed by a program on a targeted monitored object, on the one hand, provides targeted safeguarding for the targeted monitored object, which is higher than global safeguarding for a non-targeted monitored object, and satisfies requirements of a user for performing targeted safeguarding for different objects in the terminal, and on the other hand, would not cause interference on the user, and particularly. When it is detected that the object on which the program performs the operation is a program running in the foreground, not only security of the program running in the foreground is ensured, but also normal running of a control program of the user would not be interfered, so that safeguarding for the targeted monitored object has an intelligent feature.

The following is further described by using the safeguarding application method performed on a terminal on the user side as an example. As stated above, when the object on which the program performs the operation is a non-targeted monitored object, the program is detected by matching a malicious program signature database of the terminal with an attribute of the program. In an embodiment, alternatively, the program is detected by invoking a malicious program detection service in a cloud. Alternatively, a malicious program is detected by combining the foregoing two manners.

It should be noted that although a malicious program detection service running in a cloud server is used as an example for description below, it could be understood that the example is not a limitation to an implementation device of the malicious program detection service. If a calculation capability on a terminal side is sufficient, the malicious program detection service can also be run on the terminal side.

Figure 5:
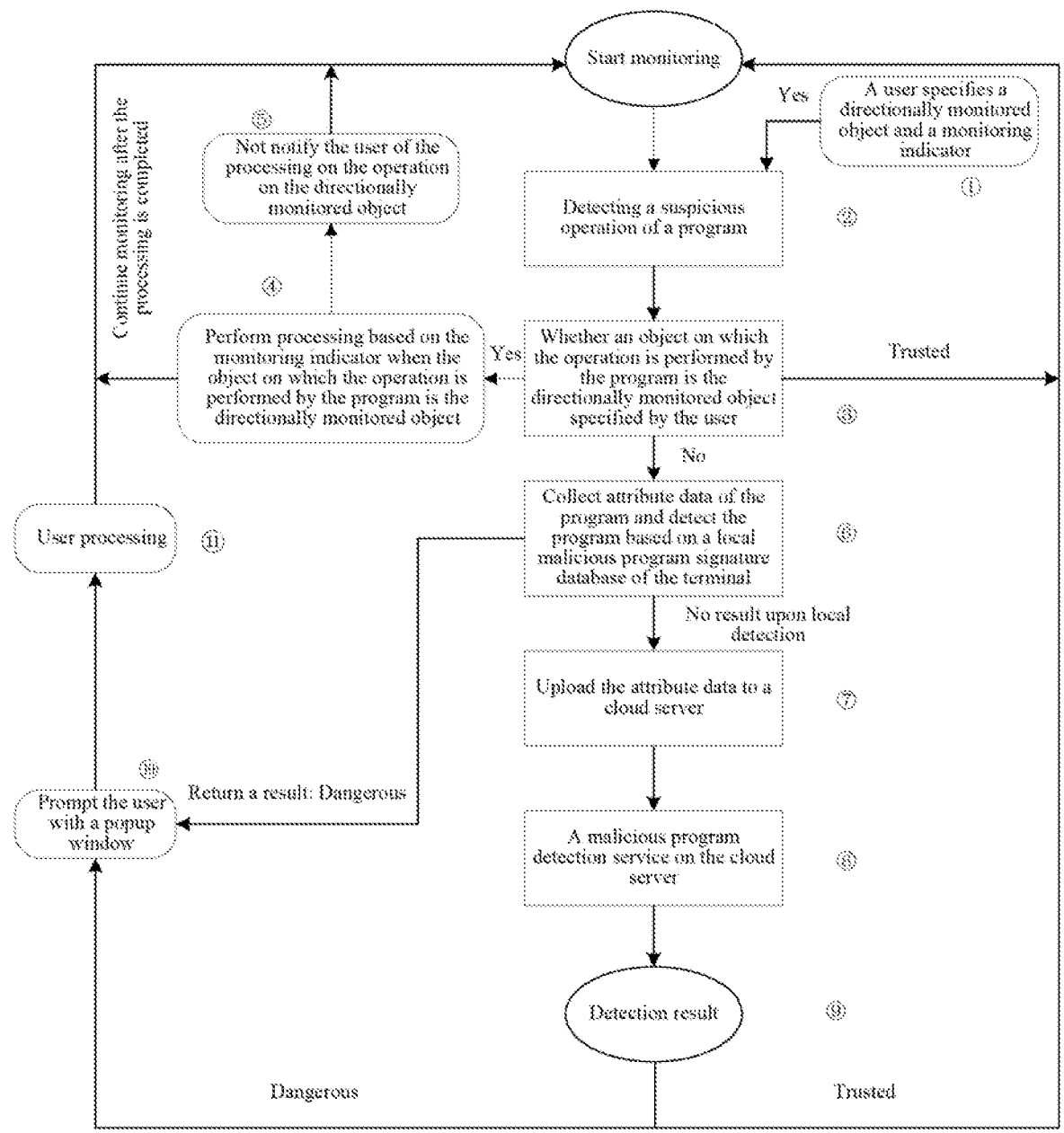
FIG. 5 is a schematic flowchart of a safeguarding method according to an embodiment of the present disclosure.

With reference to FIG. 5, which is a schematic diagram of processing of a safeguarding method according to an embodiment of the present disclosure applied to a terminal on a user side, detecting a program by combining a local malicious program signature database with a malicious program detection service in a cloud is described.

The terminal receives targeted monitored objects specified by a user and monitoring indicators (that is, the foregoing configuration information) for different monitored objects.

The terminal starts monitoring including detecting an operation of a program and an object of the operation. When a suspicious behavior of the program is detected, it is determined whether an operation object of the suspicious behavior is a targeted monitored object, if yes, processing is performed silently based on a corresponding monitoring indicator, and if the operation is allowed by the monitoring indicator, the operation of the program is allowed, if the operation is an operation forbidden by the monitoring indicator, the operation is intercepted. The user is not informed of a processing result of the operation, and monitoring is continued.

If the operation object of the suspicious behavior is not a targeted monitored object, attribute data of the program is collected, and detecting the program by matching the malicious program signature database of the terminal with an attribute in each dimension of the program is tried first. For example, attribute data in a plurality of dimensions of the program, such as a digital signature of the program, the MD5 of the program, PE file information, program information, and another attribute, are matched with attributes in corresponding dimensions in the malicious program signature database sequentially or in parallel.

For example, the attribute data in a plurality of dimensions of the program is uploaded to the cloud server in a form of a Hash table, and in the Hash table, storage locations of different attributes can be directly calculated according to keywords and mapping relationships of the attributes, thereby implementing efficient searching.

The detected program is determined to be a malicious program when attributes in at least one dimension are successfully matched, and the malicious program is handled according to a user operation or according to a predetermined processing policy.

Because local storage space of the terminal used for storing the malicious program signature database is limited, the malicious program signature database usually preferentially stores attributes of malicious programs having a high threat level or stores attributes of malicious programs with timeliness (for example, new malicious programs that appears in the last month), when the matching between the malicious program signature database of the terminal and the attribute of the program fails, that is, no result is found by detecting the program based on the local malicious program signature database of the terminal, to ensure precision of malicious program detection and avoid missing a malicious program in the terminal, the terminal uploads the attribute data of the program to the cloud server, and invokes a malicious program detection service in the cloud server to detect whether the program is a malicious program. If it is detected that the program is a malicious program by invoking the malicious program detection service, a prompt operation is performed by in a form such as a popup window, and the malicious program is handled according to a user operation, and if it is detected that the program is not a malicious program, indicating that the program is trusted, detection on a suspicious behavior performed by a program in the terminal is continued.

As stated above, a combination of the local malicious program signature database and the cloud detection service has the following effects.

On the one hand, a targeted monitoring and protecting function is provided for a user. Efficient detection on a malicious program cart be implemented based on the local malicious program signature database of the terminal, a special requirement of a user on security is satisfied, for example, an operation of a malicious program, such as stealing a code by using a Trojan virus or a plug-in, can be effectively prevented when the user is shopping or is playing a game, and meanwhile, frequently invoking the malicious program detection service in the cloud is avoided, to reduce pressure in the cloud.

On the other hand, accurate detection on a malicious program can be performed by invoking the malicious program detection service in the cloud, and efficiency and precision of malicious program detection are both taken into consideration.

Figure 6:
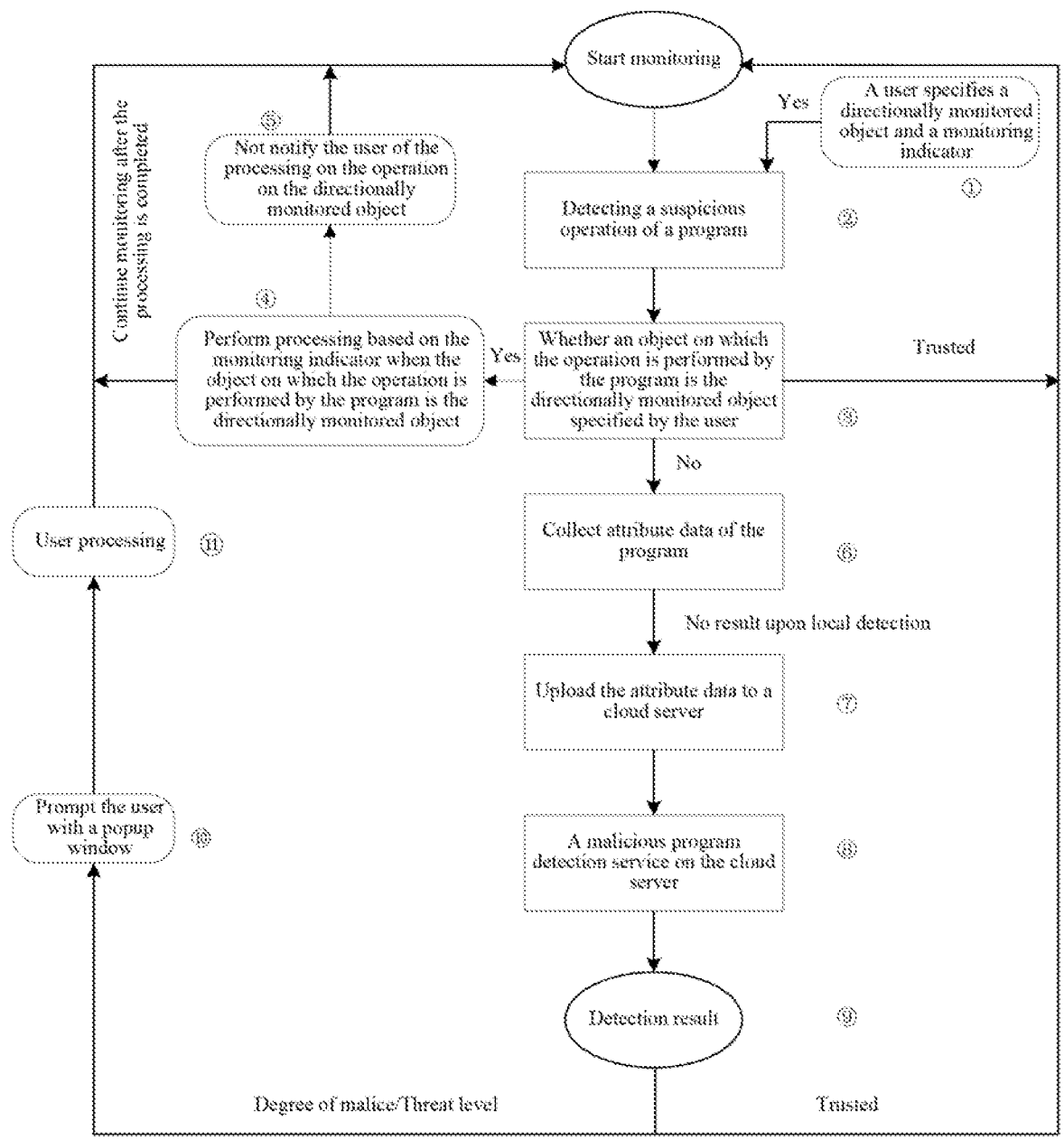
FIG. 6 is a schematic flowchart of a safeguarding method according to an embodiment of the present disclosure.

In another embodiment, in a case in which the cloud has sufficient calculation resources to respond to the malicious program detection service, FIG. 6 is a schematic flowchart of a safeguarding method according to an embodiment of the present disclosure applied to a terminal on a user side. When the terminal detects that an object on which an operation is performed by a program is not a non-targeted monitored object, the terminal detects whether the program is a malicious program by directly invoking the malicious program detection service in the cloud.

The terminal performs a prompt operation based on a detection result obtained by invoking the malicious program detection service in the cloud, and handles a malicious program according to a user operation, or handles the malicious program according to a predetermined processing policy when the user does not respond to the prompt operation within a waiting time.

For example, if the user does not choose how to perform processing within a waiting time, a unified processing manner of intercepting all or some of operations performed by the malicious program is performed, and alternatively, a processing manner of isolating or deleting the malicious program can be adopted.

Processing of uploading, the terminal, the attribute of the program to the cloud server and detecting the program by invoking the malicious program detection service in the cloud is continuously described.

Figure 7A:
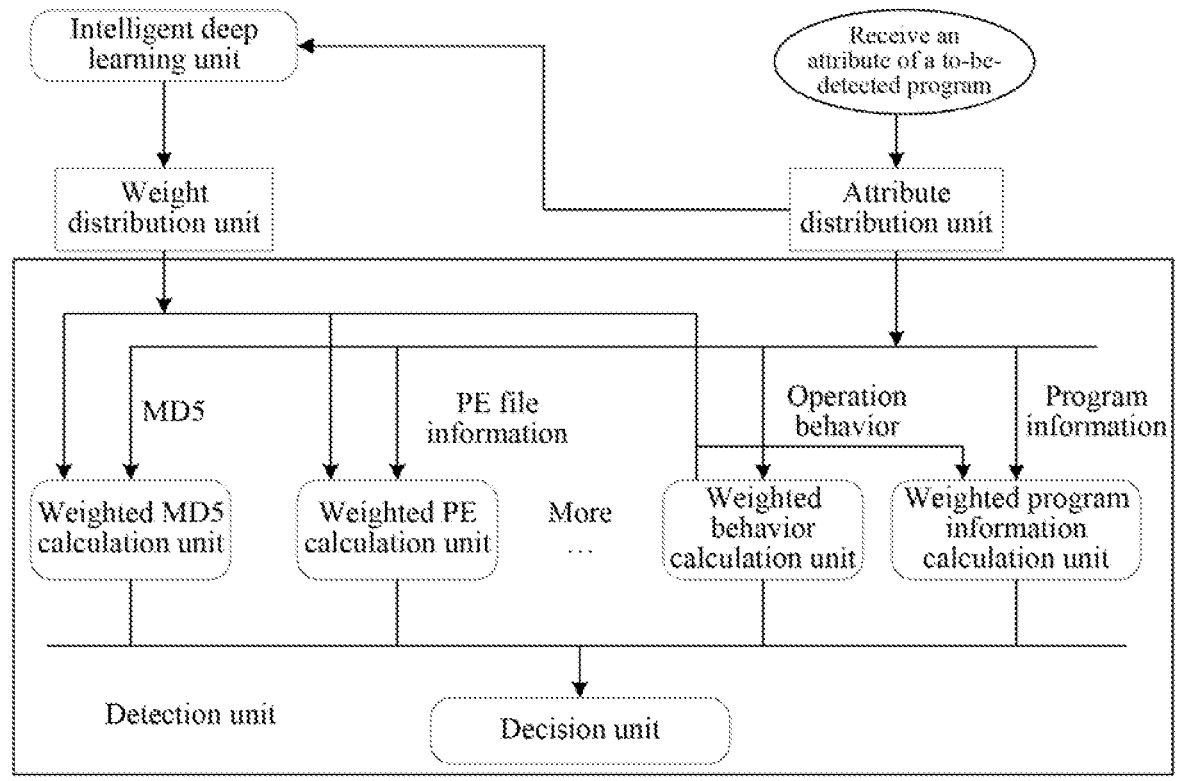
FIG. 7A is a schematic architectural diagram of a malicious program detection service according to an embodiment of the present disclosure.

In an embodiment, the terminal invokes the malicious program detection service by invoking an application programming interface provided b the cloud server. Referring to FIG. 7A, FIG. 7A is a schematic architectural diagram of a malicious program detection service, involving several functional units of a program, namely, an intelligent deep learning unit, an attribute distribution unit, a weight distribution unit, and a detection unit, which are separately described below.

The terminal inputs attributes in different dimensions of the program to the malicious program detection service, and the attribute distribution unit transmits attributes in respective dimensions of a to-be-detected program to the weight distribution unit.

The attribute distribution unit transmits the attributes in respective dimensions of the to-be-detected program to the intelligent deep learning unit for the intelligent deep learning unit to construct a sample for training a machine learning model maintained by the weight distribution unit with reference to a detection result of the detection unit, and the samples are continuously enriched with continuation of the detection process. An initial sample for training the machine learning model may alternatively be an existing malicious program signature database.

The attribute distribution unit further distributes the attributes in respective dimensions of the to-be-detected program to the detection unit, for respective calculation units in the detection unit to perform distributed detection on the respective attributes.

The intelligent deep learning unit constructs a sample based on a prior program, trains, by using the constructed sample, the machine learning model maintained by the weight distribution unit. The prior program may be a detection result obtained by the detection unit for to-be-detected program, or may be from the existing malicious program signature database.

With regard to a sample for training the machine learning model, the sample is in a data form of program type-threat level-attribute, and for example, types of the sample include:

1) A sample corresponding to prior a malicious program, for example, in a data form of "malicious program-threat level-MD5-PE file information-operation behavior-program information".

2) A sample corresponding to prior a trusted program (a non-malicious program), for example, in a data form of "trusted program-MD5-PE file information-operation behavior-program information".

The weight distribution unit maintains a weight distribution machine learning model, the weight distribution unit has performance of distributing weights for the attributes in respective dimensions of the to-be-detected program, a weight is used for representing a degree of association between an attribute in a corresponding dimension and a malicious program, and if an attribute has a higher weight, it indicates that a degree of association between the attribute and a malicious program is higher. The weight distribution unit inputs attributes in a plurality of dimensions of a program into the weight distribution machine learning model, outputs weights of the attributes in the respective dimensions by means of the weight distribution machine learning model, and outputs the attributes, together with the weights, of the to-be-detected program to the detection unit.

The weight machine learning model includes a series of base classifiers. The base classifiers are combined based on their fusion coefficients into a complete machine learning model. Each base classifier is used for outputting a prediction result of an attribute weight. Prediction results of the classifiers are integrated to form final attribute weights of the attributes.

For example, the base classifier is a decision tree classifier such as a classification function, a neural network, and a support vector machine (SVM) that use a classification and regression tree (CART) algorithm.

Figure 7B:
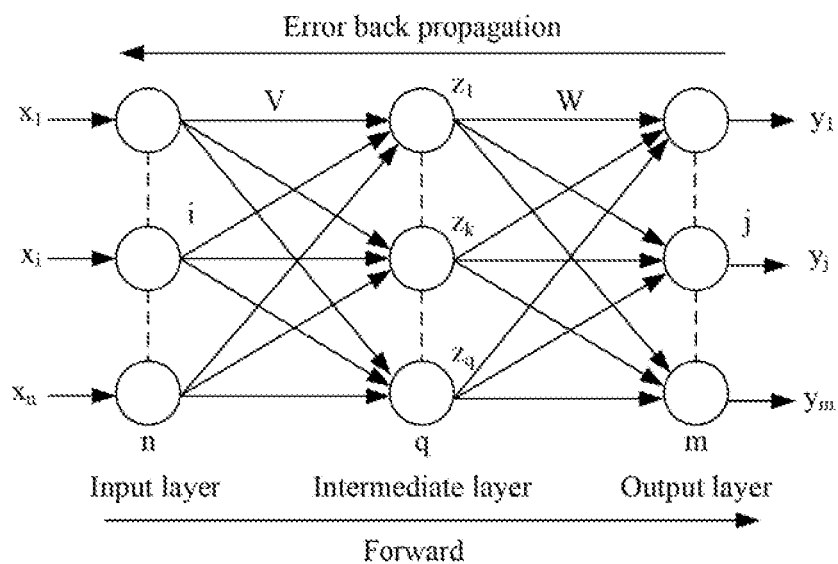
FIG. 7B is a schematic architectural diagram of a BP neural network used by a machine learning model according to an embodiment of the present disclosure.

The base classifier being a BP neural network is used as an example. Referring to FIG. 7B, FIG. 7B is a schematic structural diagram of a multilayer feedforward neural network. That is, a learning process of a BP algorithm of a BP error includes two processes, namely, a forward propagation of information and a back propagation of an error.

Respective neurons of the input layer are is responsible for receiving samples and transferring them to respective neurons of the intermediate layer. The intermediate layer is an information processing layer, is responsible for information conversion, that is, converting an attribute of a sample to an attribute weight. According to a requirement for an information conversion capability, the intermediate layer may be designed to be a single-layer or multi-player structure.

For the attribute weights transferred by a hidden layer to respective neurons of an output layer, attribute weights output by the respective neurons are integrated to complete a forward propagation process of learning, and are output by the output layer to the outside.

The machine learning model learns by training distribution of attributes of the prior malicious program in different dimensions. For example, for attributes in each dimension, a malicious program has a quantity of attributes in the corresponding dimension, and the quantity represents a degree of association between the attributes in the dimension and the malicious program. Therefore, the attribute is in positive correlation to the weight. When there is an error because an actually output attribute weight is inconsistent with an actual attribute weight of a sample, a BP stage of the error is entered, the error passes through the output layer, and weights of respective neurons in the intermediate layer are corrected in a descending manner by error gradient, and are propagated backward layer by layer to the intermediate layer.

The cyclic information forward propagation and error BP process is a process of continuously adjusting weights of neurons of the intermediate layer and is also a learning or training process of a BP neural network. This process is repeatedly performed until an error output by the network is reduced to an acceptable degree or a preset quantity of times of learning is reached.

The detection unit has performance of detecting a program based on attributes in respective dimensions of the to-be-detected program and attribute weights corresponding to the attributes in the corresponding dimensions, including detecting whether the program is a malicious program and a corresponding threat level when the program is a malicious program.

For example, the detection unit includes the following calculation units: a weighted MD5 calculation unit, a weighted PE calculation unit, a weighted behavior calculation unit, and a weighted file information calculation unit.

First, an attribute weight storage unit of each calculation unit searches the input weight attributes for attribute weights in respective dimensions corresponding to MD5, PE file information, an operation behavior, and file information and store them.

Then, each calculation unit matches an attribute in a corresponding dimension of a prior malicious program with an attribute of a program input by the attribute distribution unit, and if the matching succeeds, outputs an attribute weight stored by a corresponding calculation unit to a decision unit.

The weighted MD5 calculation unit is used as an example. First, the attribute weights output by the weight distribution unit are searched for an MD5 attribute weight of the to-be-detected program, and the attribute weight is stored, the attributes output by the attribute distribution unit are searched for MD5 of the program, the MD5 is matched with MD5 of a prior malicious program, and if the matching succeeds, the stored attribute weight is output to the decision unit.

The weighted PE calculation unit is further used as an example. First, the attribute weights output by the weight distribution unit are searched for a PE attribute weight of the to-be-detected program, and the attribute weight is stored, the attributes output by the attribute distribution unit are searched for PE file information of the program, the PE file information is matched with MD5 of a prior malicious program, and if the matching succeeds, the stored attribute weight is output to the decision unit.

The weighted behavior calculation unit and the weighted file information calculation unit can be correspondingly implemented by referring to the weighted MD5 calculation unit.

Finally, the decision unit linearly obtains a sum of attribute weights output by calculation units, where a value of the sum is in positive correlation to a probability that the program is a malicious program, and determines that the program is a malicious program if the sum exceeds a sum prior value (a sum threshold). For example, a threat level of a to-be-detected program is decided based on a value by which the sum exceeds the sum prior value and correspondences between different values and threat levels.

In addition, the detection result of the detection unit for the to-be-detected program includes information such as whether the program is a malicious program and a threat level when the program is a malicious program, is fed back to the intelligent deep learning unit to construct a new sample to train the attribute weight model. The samples are continuously enriched, and precision of subsequent attribute weight distribution for a to-be-detected program is improved.

The foregoing invoking the malicious program detection service in the cloud by the terminal has the following effects.

First, distributed detection is performed on a plurality of attributes of a to-be-detected program in respective calculation units to determine, by using attribute weights, that a program having corresponding attributes is a malicious program, and a detection speed is high; meanwhile, a comprehensive decision is made by integrating decision results of all calculation units to avoid a problem of a high false positive rate caused by making a decision based on an attribute in a single dimension.

Second, the cloud performs detection based on attributes of programs continuously uploaded by a terminal, and a detection result may be provided for a detection unit to construct a new sample to train an attribute weight model. Such a self-learning manner can continuously correct attribute weights output by the machine teaming model to improve precision, thereby increasing detection precession of the detection unit detecting a malicious program, so that a behavior of hiding a malicious program, such as a Trojan virus, by changing its attribute can be effectively detected.

Third, different from a detection manner based on a malicious program signature database, the detection essentially is performing detection based on pre-distributed attribute weights by using distributed calculation units. When a to-be-detected program is detected, it is only needed to complete distribution of attributes. Detection is performed in the respective calculation units in parallel and detection results are integrated to make a comprehensive decision. Because no malicious program signature database is relied on, particularly, compared with a detection manner based on a large-scale malicious program signature database, a calculation time is significantly shortened, and real-time of detection is ensured.

Figure 8A:
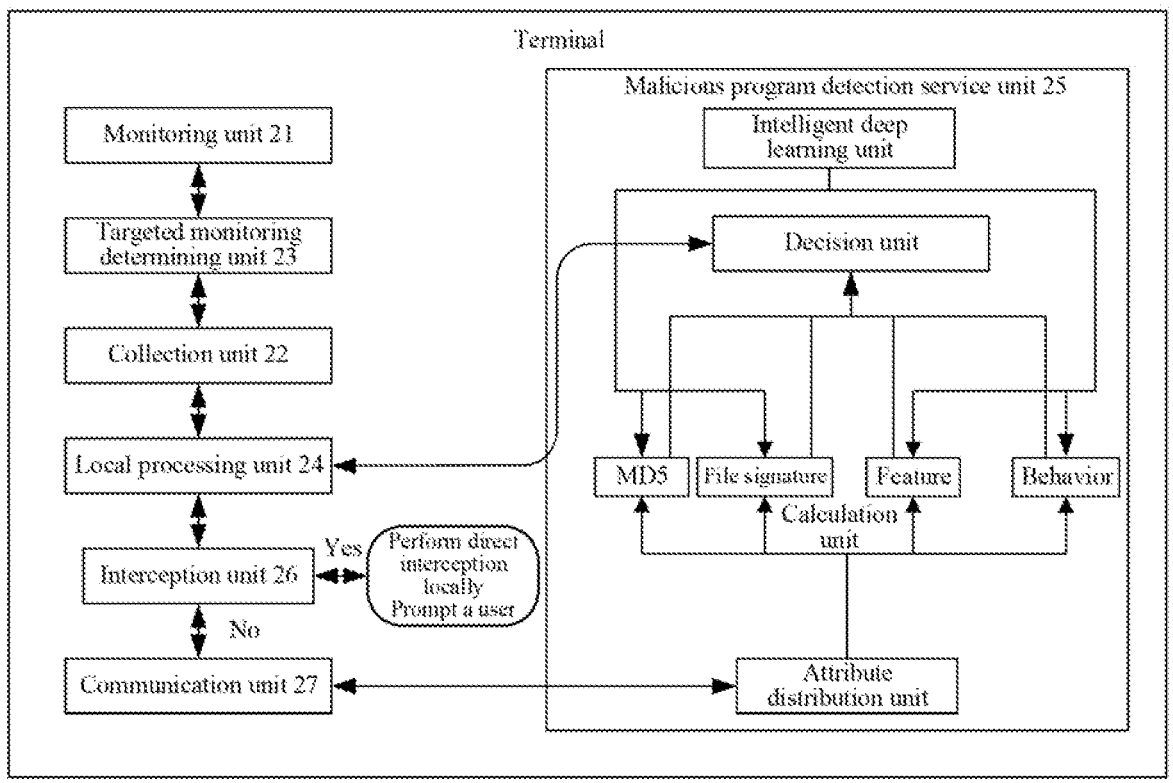
FIG. 8A is a schematic diagram of a functional structure of deploying a safeguarding apparatus on a terminal side according to an embodiment of the present disclosure.

A functional structure of the foregoing security monitoring apparatus is described. Referring to FIG. 8A, FIG. 8A is a schematic diagram of a functional structure of a safeguarding apparatus 20. Respective units of the safeguarding apparatus being deployed on a terminal is used as an example. The safeguarding apparatus includes a processor and a memory. The processor can run a computer executable instruction in each functional unit in the memory, and the functional unit in the memory includes: a monitoring unit 21, a collection unit 22, a targeted monitoring determining unit 23, a local processing unit 24, a malicious program detection service unit 25, an interception unit 26, and a communication unit 27. The respective units are described.

The monitoring unit 21 detects a program running on a terminal.

The collection unit 22 collects a suspicious operation performed by the detected program and an object on which the program performs the operation.

The targeted monitoring determining unit 23 obtains configuration information of a targeted monitored object in the terminal, and determines, based on the configuration information, that the object is the targeted monitored object.

If the object on which the program performs the operation matches the object configured in the configuration information of the targeted monitored object, it is determined that the object is a targeted monitored object; in particular, if the object on which the program performs the operation is a program configured in the configuration information, and the program is in a foreground operating state, it is determined that the object is a targeted monitored object.

The local processing unit 24 detects the program by matching a malicious program signature database of the terminal witty an attribute of the program when it is deter tined that the object is a non-targeted monitored object, and performs a prompt operation based on a detection result.

For example, attributes included in the malicious program signature database of the terminal is matched with an attribute of the program, attributes in at least two dimensions included in the malicious program signature database of the terminal are matched with attributes in corresponding dimensions of the program, and it is determined that the program is a malicious program when attributes in at least one dimension are successfully matched. The malicious program detection service unit 25 in the cloud is invoked when the matching fails.

The malicious program detection service unit 25 detects the program by running a malicious program detection service and performs a prompt operation based on a detection result. A structure of the malicious program detection service unit 25 can be understood by referring to FIG. 7A.

First, the attributes in different dimensions of the program are input into a machine learning model used for weight distribution, and a weight for an attribute in a corresponding dimension of the program is distributed based on distribution of attributes in different dimensions of a prior malicious program.

Then, the attributes in the different dimensions are matched with an attribute of a prior malicious program in parallel, a and whether the to-be-detected program is a malicious program is determined based on a weight corresponding to a successfully matched attribute. For example, whether the program is a malicious program is determined when whether a sum of weights corresponding to the successfully matched attributes exceeds a sum threshold is determined and if yes, the program is a malicious program, and a corresponding threat level is determined based on a value by which the sum exceeds the sum threshold. Otherwise, the program is a trusted program.

In addition, updating a training set of the machine learning model is also involved. The malicious program detection service unit 25 updates the training set of the machine learning model with a sample constructed based on the detection result of the program, trains a multilayer feed-forward neural network in the machine learning model based on the training set, and corrects an error of the multilayer feed-forward neural network based on the multilayer feed-forward neural network.

The interception unit 26 interprets an operation performed by a program and silently cancels the interpreting (permission) operation, and continues the interpreting operation if the to-be-detected operation is an illegitimate operation.

The communication unit 27 implements communication with a cloud server.

It could be understood that respective units in the safeguarding apparatus all can be implemented on the terminal side. Alternatively, respective units shown in FIG. 8A are be separately implemented on a terminal and a cloud server.

Figure 8B:
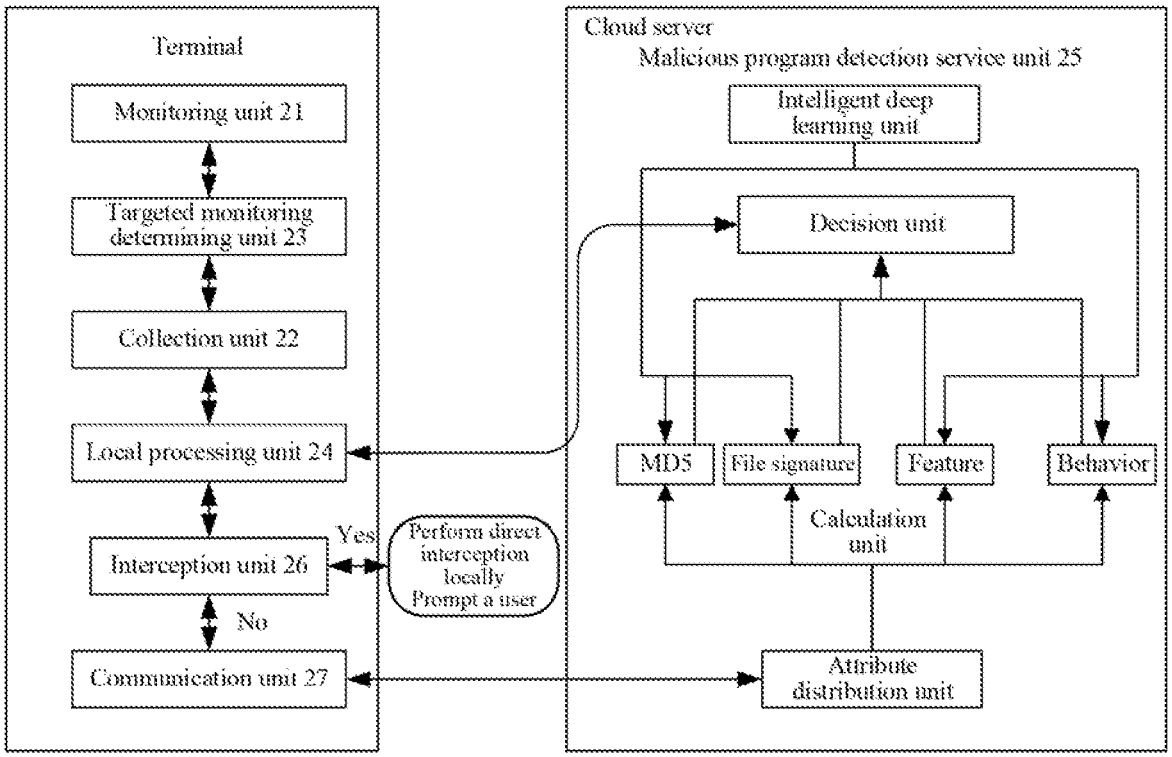
FIG. 8B is a schematic diagram of a functional structure of deploying a safeguarding apparatus on a terminal side and a cloud server according to an embodiment of the present disclosure.

In addition, respective units in the safeguarding apparatus can be separately implemented in the terminal and the cloud server. Referring to FIG. 8B is a schematic architectural diagram of a safeguarding apparatus. The malicious program detection service unit 25 is deployed on a cloud server, and when a detection result is obtained by the terminal based on a local malicious program signature database, a program is detected based on attribute data of the to-be-detected program collected by the collection unit 22.

In conclusion, this embodiment of the present disclosure has the following beneficial effects:

1) Performing safeguarding according to the configuration information of the targeted monitored object enables flexible settings by using corresponding configuration information, thereby performing targeted safeguarding for an object.

2) Global safeguarding for a non-targeted monitored object is implemented, and providing combined global safeguarding with targeted safeguarding for a targeted monitored object not only satisfy a requirement of a user for personalized safeguarding of some objects, but also ensure security of other objects inn a terminal.

3) Distributed detection is performed on a plurality of attributes of a to-be-detected program in respective calculation units to determine, by using attribute weights, that a program having corresponding attributes is a malicious program, and a detection speed is high; meanwhile, a comprehensive decision is made by integrating decision results of all calculation units to avoid a problem of a high false positive rate caused by making a decision based on an attribute in a single dimension.

4) The cloud performs detection based on attributes of programs continuously uploaded by a terminal, and a detection result may be provided for a detection unit to construct a new sample to train an attribute weight model. Such a self-learning, manner can continuously correct attribute weights output by the machine learning model to improve precision, thereby increasing detection precession of the detection unit detecting a malicious program, so that a behavior of hiding a malicious program, such as a Trojan virus, by changing its attribute can be effectively detected.

5) A malicious program detection service essentially is performing detection based on pre-distributed attribute weights by using distributed calculation units. When a to-be-detected, program is detected, it is only needed to complete distribution of attributes. Detection is performed in the respective calculation units in parallel and detection results are integrated to make a comprehensive decision. Because no malicious program signature database is relied on, particularly, compared with a detection manner based on a large-scale malicious program signature database, a calculation time is significantly shortened, and real-time of detection is ensured.

A person skilled in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage apparatus, a read-only memory (ROM), a random access memory (RAM), a magnetic disk, or an optical disk.

Alternatively, when the integrated unit f the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the related technology may be implemented in a form of a software product. The computer software product is stored in a storage medium and includes several instructions for instructing a computer apparatus (which may be a personal computer, a server, a network apparatus, or the like) to perform all or some of the methods described in the embodiments of the present disclosure. The foregoing storage medium includes: any media that can store program code, such as a removable storage apparatus, a ROM, a RAM, a magnetic disk, or an optical disc.

Correspondingly, an embodiment of the present disclosure provides a computer storage medium, storing a computer executable instruction, and when being executed by a processor, the computer executable instruction performing the foregoing safeguarding method of the embodiments of the present disclosure.

Figure 9:
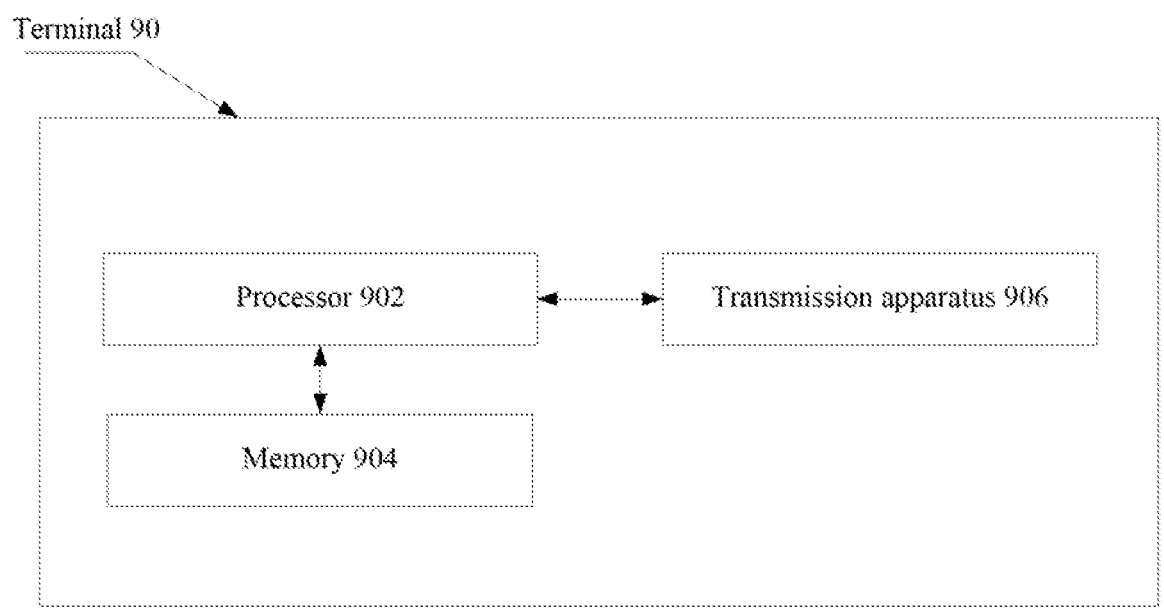
FIG. 9 is a schematic structural composition diagram of a terminal according to an embodiment of the present disclosure.

FIG. 9 is a schematic structural composition diagram of a terminal, according to an embodiment of the present disclosure. As shown in FIG. 9, a terminal 90 may include one or more (only one is shown in the figure) processors 902 (the processor 902 may be, but is not limited to, a processing apparatus such as a micro controller unit (MCU), a field-programmable gate array), a memory 904 configured to store data, and a transmission apparatus 906 configured to implement a communication function. It may be understood by a person of ordinary skill in the art that the structure shown in FIG. 9 is merely illustrative instead of limiting a structure of the foregoing electronic apparatus. For example, the terminal 90 may include components more or less than those shown in FIG. 9 or have a configuration different from that shown in FIG. 9.

The memory 904 may be configured to store a software program and a software module or software unit. For example, a program instruction/module corresponding to a method for system safeguarding in an embodiment of the present disclosure, and the processor 902 performs various functional applications and data processing by running a software program and a module stored in the memory 904, that is, implementing the foregoing method. The memory 904 may include a high-speed random memory, and may also include a nonvolatile memory such as one or more magnetic storage devices, a flash memory, or another nonvolatile solid-state memory. In some embodiments, the memory 904 may further include memories remotely disposed relative to the processor 902, and these remote memories may be connected to the terminal 90 through a network. Instances of the network include, but are not limited to, the internee, an intranet, a local area network, a mobile communications network, and a combination thereof.

The transmission apparatus 906 is configured to receive or send data through a network. Specific instances of the foregoing network may include a wireless network provided by a communication provider of the terminal 90. In an instance, the transmission apparatus 906 includes a network interface controller (NIC) that may be connected to another network device through a base station, thereby communicating with the Internet. In an instance, the transmission apparatus 906 is a radio frequency (RF) module that is configured to communicate with the Internet in a wireless manner.

A portion in the present disclosure may be realized in the form of a software functional module or a software unit or sold or used as an independent product, the portion may also be stored in a computer readable storage medium. In the present disclosure, a functional module/unit or a functional portion may refer to one or more computer programs stored in one or more computer readable media. When executed by a processor, the computer programs may implement the corresponding functions of the functional module or functional portion. Further, a functional module or a functional portion may include a hardware component and one or more computer programs stored in one or more computer readable media. When executed by a processor, the hardware component and the computer programs may implement the corresponding functions of the functional nodule or functional portion.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL PRACTICABILITY

In the technical solutions of the embodiments of the present disclosure, a solution of setting a targeted monitored object is provided. Targeted safeguarding can be performed based on configuration information of the targeted monitored object for an operation performed by a program on the targeted monitored object, so as to provide safeguarding for the targeted monitored object, so that safeguarding of a non-targeted monitored object and safeguarding of a targeted monitored object can be easily distinguished according to configuration information. Meanwhile, safeguarding of a targeted monitored object can be flexibly set according to corresponding configuration information, thereby performing targeted safeguarding on an object.

What is claimed is:

1. A system safeguarding method, comprising:
   detecting, by a computing terminal, a program operating on the computing terminal, and intercepting an operation performed by the program, the operation being at least one of read, write, and injection;
   identifying, by the computing terminal, an object on which the program performs the operation;
   obtaining, by the computing terminal, configuration information of targeted monitored objects indicating that objects belonging to one or more types are preconfigured by a user to be identified as the targeted monitored objects;
   determining whether the object is a targeted monitored object based on whether the object on which the program performs the operation belongs to one of the one or more types preconfigured by the user;
   in response to the object being a targeted monitored object,
      determining whether the operation performed by the program on the object is a legitimate operation according to the configuration information of a monitored type that the object belongs to, wherein a format of the configuration information of the monitored type includes: the monitored type; a type of operation performed on an object of the monitored type selected from read, write, and injection; and a legitimacy identification indicating a configuration made by the user about whether the type of operation is a legitimate operation or an illegitimate operation; and
      canceling intercepting the operation if the operation is a legitimate operation, and continuously intercepting the operation if the operation is an illegitimate operation; and
   in response to the object being a non-targeted monitored object, detecting whether the program performed the operation on the object is a malicious program, and performing a prompt operation based on a detection result,
   wherein:
   the legitimacy identification in the configuration information of the monitored type of targeted monitored objects is determined according to a user selection on a configuration setting interface; and
   when the user only sets the monitored type of targeted monitored objects and does not set the legitimacy identification, the legitimacy identification of the configuration information is determined according to a default setting of the computing terminal.

2. The method according to claim 1, further comprising:
   determining that the object is the targeted monitored object if the configuration information indicates that an object belonging to a preset program is configured by the user to be identified as the targeted monitored object and the object on which the program performs the operation is the preset program, and the preset program is in a foreground operating state.

3. The method according to claim 1, wherein determining whether the operation performed by the program on the object is a legitimate operation comprises:
determining whether the operation performed by the program on the object matches a pre-configured illegitimate operation in the configuration information of the targeted monitored object, and if yes, determining that the operation performed by the program on the object is an illegitimate operation; otherwise, determining that the operation is a legitimate operation.

4. The method according to claim 1, further comprising:
in response to the object being a non-targeted monitored object, detecting whether the program performed the operation on the object is a malicious program by matching a malicious program signature database with an attribute of the program or running a malicious program detection service; and performing a prompt operation based on a detection result.

5. The method according to claim 4, wherein matching a malicious program signature database with an attribute of the program or running a malicious program detection service comprises:
matching the attribute of the program with attributes comprised in the malicious program signature database, and if the attributes are not matched, invoking the malicious program detection service in a cloud to detect whether the program is a malicious program.

6. The method according to claim 4, wherein matching a malicious program signature database with an attribute of the program comprises:
correspondingly matching attributes in at least two dimensions comprised in the malicious program signature database with attributes in corresponding dimensions of the program, and determining that the program is a malicious program when attributes in at least one dimension are successfully matched.

7. The method according to claim 4, wherein running a malicious program detection service comprises:
determining weights corresponding to attributes in different dimensions of the program, matching the attributes in the different dimensions with an attribute of a prior malicious program in parallel, and determining, based on a weight corresponding to a successfully matched attribute, whether the detected program is a malicious program.

8. The method according to claim 7, wherein the determining, based on a weight corresponding to a successfully matched attribute, whether the detected program is a malicious program comprises:
determining whether a sum of the weights corresponding to the successfully matched attributes is greater than a sum threshold, and if it is determined that the detected program is a malicious program, determining a corresponding threat level based on a value by which the sum exceeds the sum threshold; otherwise, determining that the detected program is a trusted program.

9. The method according to claim 7, wherein the determining weights corresponding to attributes in different dimensions of the program comprises:
inputting the attributes in different dimensions of the program into a machine learning model used for weight distribution, and distributing, based on distribution of attributes in different dimensions of a prior malicious program, a weight for an attribute in a corresponding dimension of the program.

10. The method according to claim 9, further comprising:
updating a training set of the machine learning model with a sample constructed based on the detection result of the program, training a multilayer feed-forward neural network in the machine learning model based on the training set, and correcting an error of the multilayer feed-forward neural network based on the multilayer feed-forward neural network.

11. The method according to claim 1, wherein:
the objects belonging to the one or more types preset by the user includes at least one of: an object from a program; an object from system data, or an object from user data.

12. The method according to claim 1, wherein:
the objects belonging to the one or more types preset by the user includes at least one of: a text file type object, a media file type object, a program type object, a program installation package type object, or a library file type object.

13. A safeguarding apparatus, comprising a processor and a memory, the processor being capable of running a computer executable instruction in each function unit on the memory, and the functional unit on the memory comprising:
a monitoring unit, configured to detect a program running on a terminal, and determine an object on which an operation is performed by the program, the operation being at least one of read, write, and injection;
an interception unit, configured to intercept the operation performed by the program;
a targeted monitoring determining unit, configured to obtain configuration information of targeted monitored objects indicating that objects belonging to one or more types are preconfigured by a user to be identified as the targeted monitored objects, and determine whether the object is a targeted monitored object based on whether the object on which the program performs the operation belongs to one of the one or more types preconfigured by the user;
a processing unit, configured to determine, in response to the object being a targeted monitored object, whether the operation performed by the program on the object is a legitimate operation according to the configuration information of a monitored type that the object belongs to, wherein a format of the configuration information of the monitored type includes: the monitored type; a type of operation performed on an object of the monitored type selected from read, write, and injection; and a legitimacy identification indicating a configuration made by the user about whether the type of operation is a legitimate operation or an illegitimate operation; and
the interception unit, configured to cancel intercepting the operation if the operation is a legitimate operation, and continuously intercept the operation if the operation is an illegitimate operation,
wherein:
the legitimacy identification in the configuration information of the monitored type of targeted monitored objects is determined according to a user selection on a configuration setting interface; and
when the user only sets the monitored type of targeted monitored objects and does not set the legitimacy identification, the legitimacy identification of the configuration information is determined according to a default setting of the computing terminal.

14. The apparatus according to claim 13, wherein:
the targeted monitoring determining unit is further configured to determine that the object is the targeted monitored object if the configuration information indicates that an object belonging to a preset program is configured by the user to be identified as the targeted monitored object and the object on which the program performs the operation is the preset program configured in the configuration information, and the preset program is in a foreground operating state.

15. The apparatus according to claim 13, wherein:
the processing unit is further configured to determine whether the operation performed by the program on the object matches a pre-configured illegitimate operation in the configuration information of the targeted monitored object, and if yes, determines that the operation performed by the program on the object is an illegitimate operation; otherwise, the operation is a legitimate operation.

16. The apparatus according to claim 13, wherein the processing unit is further configured to:
detect, in response to the object being a non-targeted monitored object, whether the program performed the operation on the object is a malicious program by performing at least one of: matching a malicious program signature database with an attribute of the program or running a malicious program detection service; and
perform a prompt operation based on a detection result.

17. The apparatus according to claim 16, wherein the processing unit is further configured to match the attribute of the program with attributes comprised in the malicious program signature database, and if the attributes are not matched, invoke the malicious program detection service in a cloud to detect whether the program is a malicious program.

18. The apparatus according to claim 16, wherein the processing unit is further configured to correspondingly match attributes in at least two dimensions comprised in the malicious program signature database of the terminal with attributes in corresponding dimensions of the program, and determine that the program is a malicious program when attributes in at least one dimension are successfully matched.

19. A non-transitory computer-readable storage medium storing computer program instructions executable by at least one processor to perform:
detecting a program running on a terminal, and intercepting an operation performed by the program, the operation being at least one of read, write, and injection;
determining an object on which the program performs the operation;
obtaining configuration information of targeted monitored objects indicating that objects belonging to one or more types are preconfigured by a user to be identified as the targeted monitored objects;
determining whether the object is the targeted monitored object based on whether the object on which the program performs the operation belongs to one of the one or more types preconfigured by the user;
determining whether the operation performed by the program on the object is a legitimate operation according to the configuration information of a monitored type that the object belongs to, wherein a format of the configuration information of the monitored type includes: the monitored type; a type of operation performed on an object of the monitored type selected from read, write, and injection; and a legitimacy identification indicating a configuration made by the user about whether the type of operation is a legitimate operation or an illegitimate operation; and
canceling intercepting the operation if the operation is a legitimate operation, and continuously intercepting the operation if the operation is an illegitimate operation,
wherein:
the legitimacy identification in the configuration information of the monitored type of targeted monitored objects is determined according to a user selection on a configuration setting interface; and
when the user only sets the monitored type of targeted monitored objects and does not set the legitimacy identification, the legitimacy identification of the configuration information is determined according to a default setting of the computing terminal.

* * * * *